United States Patent
He et al.

(10) Patent No.: US 12,417,520 B2
(45) Date of Patent: *Sep. 16, 2025

(54) SYSTEMS AND METHODS FOR A TONE MAPPER SOLUTION FOR AN AUTONOMOUS DRIVING SYSTEM

(71) Applicant: Waymo LLC, Mountain View, CA (US)

(72) Inventors: Xiaoying He, Palo Alto, CA (US); Ryan Geiss, San Jose, CA (US); Pieter Kapsenberg, Santa Clara, CA (US); Carl Warren Craddock, San Francisco, CA (US); Zhinan Xu, San Jose, CA (US); Lucian Ion, Mountain View, CA (US); Ajay Chandra Venkata Gummalla, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,388

(22) Filed: May 30, 2024

(65) Prior Publication Data
US 2024/0320810 A1    Sep. 26, 2024

Related U.S. Application Data

(63) Continuation of application No. 17/644,432, filed on Dec. 15, 2021, now Pat. No. 12,020,412.

(51) Int. Cl.
*G06T 5/92* (2024.01)
*G06T 3/4007* (2024.01)
*G06T 5/94* (2024.01)

(52) U.S. Cl.
CPC .............. *G06T 5/92* (2024.01); *G06T 3/4007* (2013.01); *G06T 5/94* (2024.01);
(Continued)

(58) Field of Classification Search
CPC ........... G06T 5/92; G06T 3/4007; G06T 5/94; G06T 2207/20084; G06T 2207/20208;
(Continued)

(56) References Cited

U.S. PATENT DOCUMENTS

| 8,947,555 B2 | 2/2015 | Velarde et al. |
| 9,064,313 B2 | 6/2015 | Seshadrinathan et al. |

(Continued)

FOREIGN PATENT DOCUMENTS

WO    2019104047 A1    5/2019

OTHER PUBLICATIONS

Ahn et al., "Adaptive Local Tone Mapping Based on Retinex for High Dynamic Range Images," IEEE International Conference on Consumer Electronics (ICCE), https://koasas.kaisl.ac.kr/bitstream/10203/172985/1/73275.pdf, 2013, pp. 153-156.

(Continued)

*Primary Examiner* — Dhaval V Patel
(74) *Attorney, Agent, or Firm* — McDonnell Boehnen Hulbert & Berghoff LLP

(57) ABSTRACT

A system is provided that includes an image sensor coupled to a vehicle, and control circuitry configured to perform operations including receiving, from the image sensor, an input stream comprising high dynamic range (HDR) image data associated with an environment of the vehicle, and processing the input stream at the vehicle by applying a global tone mapping, followed by offline image processing that can include applying a local tone mapping to the globally tone mapped images of the same input stream.

20 Claims, 18 Drawing Sheets

(52) U.S. Cl.
CPC ............... *G06T 2207/20084* (2013.01); *G06T 2207/20208* (2013.01); *G06T 2207/30252* (2013.01)

(58) Field of Classification Search
CPC ............. G06T 2207/30252; G06T 5/60; G06T 2207/10016; G06T 2207/10024; G06T 5/90

See application file for complete search history.

(56) References Cited

U.S. PATENT DOCUMENTS

| | | | |
|---|---|---|---|
| 9,979,895 B2* | 5/2018 | Smolic | ................. H04N 23/741 |
| 10,148,906 B2 | 12/2018 | Seifi et al. | |
| 10,943,335 B2 | 3/2021 | Nishimura et al. | |
| 11,138,397 B2 | 10/2021 | Gao et al. | |
| 11,734,806 B2* | 8/2023 | Chiu | ......................... G06T 5/92 382/274 |
| 2019/0156516 A1 | 5/2019 | Nikkanen et al. | |
| 2019/0258878 A1 | 8/2019 | Koivisto et al. | |
| 2019/0295229 A1 | 9/2019 | Yadid-Pecht et al. | |
| 2020/0388009 A1 | 12/2020 | Douady-Pleven et al. | |
| 2020/0389581 A1 | 12/2020 | Dabral et al. | |
| 2021/0035273 A1 | 2/2021 | Deng et al. | |
| 2021/0272251 A1 | 9/2021 | Unger et al. | |
| 2021/0358627 A1 | 11/2021 | Longmire et al. | |
| 2021/0360157 A1* | 11/2021 | Veit | ...................... H04N 23/741 |
| 2022/0021802 A1* | 1/2022 | Le | ........................ H04N 25/585 |
| 2022/0284553 A1* | 9/2022 | Hwang | ..................... G06T 5/00 |
| 2022/0358627 A1* | 11/2022 | Deng | ........................ G06T 5/92 |
| 2023/0073970 A1* | 3/2023 | Lin | ........................ H04N 23/82 |
| 2023/0127327 A1 | 4/2023 | Abdelhamed et al. | |

OTHER PUBLICATIONS

Ou et al., "Real-time Tone Mapping: A State of the Art Report," arXiv:2003:03074v1, Mar. 6, 2020, 55 pages.

Piniarski et al., "Efficient HDR tone-mapping for ADAS applications," Conference Paper, https://www.researchgate.net/publication/338072847, Sep. 2019, 8 pages.

* cited by examiner

800A

| | C1 | C2 | C3 | C4 | C5 | C6 |
|---|---|---|---|---|---|---|
| | Linear raw image bit depth (f-stops) | Linear raw image value | Gamma space (compress to 8 bits) | Change (No. of DNs representing the f-stop) | Log space (compress to 8 bits) | Change (No. of DNs representing the f-stop) |
| R1 | | 0 | 0 | | 0 | |
| R2 | | 1 | 6 | | 2 | |
| R3 | 1 | 2 | 8 | 2 | 3 | 2 |
| R4 | 2 | 4 | 11 | 3 | 5 | 3 |
| R5 | 3 | 8 | 15 | 4 | 12 | 5 |
| R6 | 4 | 16 | 21 | 6 | 21 | 9 |
| R7 | 5 | 32 | 28 | 8 | 36 | 15 |
| R8 | 6 | 64 | 39 | 10 | 57 | 21 |
| R9 | 7 | 128 | 53 | 14 | 84 | 27 |
| R10 | 8 | 256 | 72 | 20 | 115 | 31 |
| R11 | 9 | 512 | 99 | 27 | 148 | 33 |
| R12 | 10 | 1024 | 136 | 37 | 183 | 35 |
| R13 | 11 | 2048 | 186 | 50 | 219 | 36 |
| R14 | 12 | 4096 | 255 | 69 | 255 | 36 |

Figure 8A

| epsilon: | | 0.00001 | 0.0003 | 0.0007 | 0.0015 | 0.0035 | 0.01 | 0.03 | |
|---|---|---|---|---|---|---|---|---|---|
| linear input (after down-exposure); float | remapped to [0..1] | \multicolumn{7}{c}{(log(remapped + epsilon) - log(epsilon)) / (log(1 + epsilon) - log(epsilon)) * 255} | | |
| C1 | C2 | A | B | C | D | E | F | G | gamma curve |
| 0 | 0 | 0 | 0 | 0 | 0 | 0 | 0 | 0 | 0 |
| 0.125 | 0 | 87 | 30 | 19 | 11 | 6 | 3 | 1 | 8 |
| 0.25 | 0.001 | 102 | 46 | 31 | 20 | 11 | 5 | 2 | 11 |
| 0.5 | 0.002 | 117 | 63 | 47 | 33 | 20 | 10 | 5 | 15 |
| 1 | 0.004 | 132 | 83 | 66 | 50 | 34 | 18 | 9 | 21 |
| 2 | 0.008 | 148 | 104 | 88 | 72 | 53 | 32 | 17 | 28 |
| 4 | 0.016 | 163 | 125 | 111 | 96 | 77 | 52 | 30 | 39 |
| 8 | 0.031 | 178 | 146 | 134 | 121 | 104 | 78 | 52 | 53 |
| 16 | 0.063 | 194 | 168 | 158 | 147 | 133 | 110 | 81 | 72 |
| 32 | 0.125 | 209 | 190 | 182 | 174 | 163 | 144 | 119 | 99 |
| 64 | 0.251 | 224 | 212 | 207 | 201 | 193 | 180 | 161 | 136 |
| 128 | 0.502 | 240 | 233 | 231 | 228 | 224 | 217 | 207 | 186 |
| 255 | 1 | 255 | 255 | 255 | 255 | 255 | 255 | 255 | 255 |

| DN per f-stop: | | | | | | | | | |
|---|---|---|---|---|---|---|---|---|---|
| C1 from: | C2 to: | A | B | C | D | E | F | G | gamma curve |
| 9BR1  0 | 0.125 | 87 | 30 | 19 | 11 | 6 | 3 | 1 | 8 |
| 9BR2  0.125 | 0.25 | 15 | 15 | 12 | 9 | 5 | 3 | 1 | 3 |
| 9BR3  0.25 | 0.5 | 15 | 18 | 16 | 13 | 9 | 5 | 2 | 4 |
| 9BR4  0.5 | 1 | 15 | 20 | 19 | 18 | 14 | 8 | 4 | 6 |
| 1 | 2 | 15 | 21 | 22 | 21 | 19 | 14 | 8 | 8 |
| 2 | 4 | 15 | 21 | 23 | 24 | 24 | 20 | 14 | 10 |
| 4 | 8 | 15 | 21 | 24 | 25 | 27 | 26 | 21 | 14 |
| 8 | 16 | 15 | 22 | 24 | 26 | 29 | 31 | 30 | 20 |
| 16 | 32 | 15 | 22 | 24 | 27 | 30 | 34 | 37 | 27 |
| 32 | 64 | 15 | 22 | 24 | 27 | 31 | 36 | 43 | 37 |
| 64 | 128 | 15 | 22 | 24 | 27 | 31 | 37 | 46 | 50 |
| 128 | 255 | 15 | 22 | 24 | 27 | 31 | 38 | 48 | 69 |

Figure 9B

| | 1002 | | | | | | | | | 1000A |
|---|---|---|---|---|---|---|---|---|---|---|
| | epsilon: | | 0.00001 | 0.00001 | 0.00001 | 0.00001 | 0.00001 | 0.00001 | 0.00001 | |
| | cutoff: | 1004 | 0.00002 | 0.00004 | 0.00008 | 0.00016 | 0.00032 | 0.00064 | 0.00128 | |
| | linear input (after down-exposure); float | remapped to [0..1] | $255 * \max(0, (\log(\text{remapped} + \text{epsilon}) - \log(\text{cutoff})) / (\log(1 + \text{epsilon}) - \log(\text{cutoff})))$ | | | | | | C3 | C4 |
| | C1 | C2 | A | B | C | D | E | F | G | linear | gamma 1/2.2 |
| | 0 | 0 | 0 | 0 | 0 | 0 | 0 | 0 | 0 | 0 | 0 |
| 10AR1 | 0.0625 | 0.000245 | 60 | 47 | 31 | 14 | 0 | 0 | 0 | 0 | 6 |
| 10AR2 | 0.125 | 0.00049 | 76 | 64 | 50 | 33 | 14 | 0 | 0 | 0 | 8 |
| 10AR3 | 0.25 | 0.00098 | 92 | 81 | 68 | 53 | 36 | 15 | 0 | 0 | 11 |
| 10AR4 | 0.5 | 0.001961 | 108 | 98 | 87 | 73 | 58 | 39 | 17 | 1 | 15 |
| | 1 | 0.003922 | 124 | 116 | 105 | 93 | 79 | 63 | 43 | 1 | 21 |
| | 2 | 0.007843 | 141 | 133 | 124 | 114 | 101 | 87 | 69 | 2 | 28 |
| | 4 | 0.015686 | 157 | 150 | 143 | 134 | 123 | 111 | 96 | 4 | 39 |
| | 8 | 0.031373 | 173 | 168 | 161 | 154 | 145 | 135 | 122 | 8 | 53 |
| | 16 | 0.062745 | 190 | 185 | 180 | 174 | 167 | 159 | 149 | 16 | 72 |
| | 32 | 0.12549 | 206 | 203 | 199 | 194 | 189 | 183 | 176 | 32 | 99 |
| | 64 | 0.25098 | 222 | 220 | 218 | 215 | 211 | 207 | 202 | 64 | 136 |
| | 128 | 0.501961 | 239 | 238 | 236 | 235 | 233 | 231 | 229 | 128 | 186 |
| | 255 | 1 | 255 | 255 | 255 | 255 | 255 | 255 | 255 | 255 | 255 |

| input range: | | | | DN per f-stop: | | | | | gamma |
|---|---|---|---|---|---|---|---|---|---|
| C1 from: | C2 to: | A | B | C | D | E | F | G | linear | 1/2.2 |
| 10BR1 | 0 | 0.0625 | 60 | 47 | 31 | 13.6 | 0 | 0 | 0 | 0 | 6 |
| 10BR2 | 0.0625 | 0.125 | 16 | 17 | 18 | 19.6 | 14 | 0 | 0 | 0 | 2 |
| 10BR3 | 0.125 | 0.25 | 16 | 17 | 18 | 19.9 | 22 | 15 | 0 | 0 | 3 |
| 10BR4 | 0.25 | 0.5 | 16 | 17 | 19 | 20.1 | 22 | 24 | 17 | 0 | 4 |
| | 0.5 | 1 | 16 | 17 | 19 | 20.1 | 22 | 24 | 26 | 1 | 6 |
| | 1 | 2 | 16 | 17 | 19 | 20.2 | 22 | 24 | 26 | 1 | 8 |
| | 2 | 4 | 16 | 17 | 19 | 20.2 | 22 | 24 | 27 | 2 | 10 |
| | 4 | 8 | 16 | 17 | 19 | 20.2 | 22 | 24 | 27 | 4 | 14 |
| | 8 | 16 | 16 | 17 | 19 | 20.2 | 22 | 24 | 27 | 8 | 20 |
| | 16 | 32 | 16 | 17 | 19 | 20.2 | 22 | 24 | 27 | 16 | 27 |
| | 32 | 64 | 16 | 17 | 19 | 20.2 | 22 | 24 | 27 | 32 | 37 |
| | 64 | 128 | 16 | 17 | 19 | 20.2 | 22 | 24 | 27 | 64 | 50 |
| | 128 | 255 | 16 | 17 | 19 | 20.1 | 22 | 24 | 26 | 127 | 69 |

Figure 10B

SYSTEMS AND METHODS FOR A TONE MAPPER SOLUTION FOR AN AUTONOMOUS DRIVING SYSTEM

CROSS-REFERENCE TO RELATED DISCLOSURE

This application is a continuation of U.S. patent application Ser. No. 17/644,432, filed Dec. 15, 2021, which is incorporated herein by reference in its entirety.

BACKGROUND

A vehicle may be equipped with a variety of sensors to facilitate safe operation of the vehicle in a surrounding environment. Example sensors may include image sensors, among other types of sensors. An image sensor includes a plurality of light-sensing pixels that measure an intensity of light incident thereon and thereby collectively capture an image of an environment. The intensity of light may have a high dynamic range based on the environment. A tone mapping may be applied to the image to allow the image to be processed. Image sensors may be used in a plurality of applications such as photography, robotics, and autonomous vehicles.

SUMMARY

Examples relate to tone mapping of high dynamic range (HDR) images captured by a camera of an autonomous vehicle. Tone mapping is generally performed to reduce a bit depth of the HDR images. Images with a reduced bit depth consume fewer computational resources for storage and processing tasks, and are more suitable for human viewing.

In a first example embodiment, system is provided that includes one or more sensors coupled to a vehicle, wherein the one or more sensors include an image sensor, and control circuitry configured to perform operations including (i) receiving, from the image sensor, an input stream comprising high dynamic range (HDR) image data associated with an environment of the vehicle, (ii) applying a global tone mapping to one or more images of the input stream, wherein the global tone mapping allocates bits between one or more control points of an image of the one or more images, wherein the one or more control points is based on pixel values of the image, and (iii) providing the one or more globally tone mapped images for (a) online image processing at the vehicle by a neural network, and (b) offline image processing comprising applying a local tone mapping to the one or more globally tone mapped images to transform the one or more globally tone mapped images to low dynamic range (LDR) image data.

In a second example embodiment, a non-transitory computer readable storage medium is provided having stored thereon instructions that, when executed by a computing device, cause the computing device to perform operations. The operations include receiving, from an image sensor coupled to a vehicle, an input stream comprising high dynamic range (HDR) image data associated with an environment of the vehicle. The operations also include applying a global tone mapping to one or more images of the input stream, wherein the global tone mapping allocates bits between one or more control points of an image of the one or more images, wherein the one or more control points is based on pixel values of the image. The operations further include providing the one or more globally tone mapped images for (a) online image processing at the vehicle by a neural network, and (b) offline image processing comprising applying a local tone mapping to the one or more globally tone mapped images to transform the one or more globally tone mapped images to low dynamic range (LDR) image data.

In a third example embodiment, a method is provided that includes receiving, from an image sensor coupled to a vehicle, an input stream comprising high dynamic range (HDR) image data associated with an environment of the vehicle. The method also includes applying a global tone mapping to one or more images of the input stream, wherein the global tone mapping allocates bits between one or more control points of an image of the one or more images, wherein the one or more control points is based on pixel values of the image. The method further includes providing the one or more globally tone mapped images for (a) online image processing at the vehicle by a neural network, and (b) offline image processing comprising applying a local tone mapping to the one or more globally tone mapped images to transform the one or more globally tone mapped images to low dynamic range (LDR) image data.

In a fourth example embodiment, a vehicle is provided that includes one or more sensors coupled to the vehicle, wherein the one or more sensors include an image sensor. The vehicle also includes control circuitry configured to perform operations including (i) receiving, from the image sensor, an input stream comprising high dynamic range (HDR) image data associated with an environment of the vehicle, (ii) applying a global tone mapping to one or more images of the input stream, wherein the global tone mapping allocates bits between one or more control points of an image of the one or more images, wherein the one or more control points is based on pixel values of the image, and (iii) providing the one or more globally tone mapped images for (a) online image processing at the vehicle by a neural network, and (b) offline image processing comprising applying a local tone mapping to the one or more globally tone mapped images to transform the one or more globally tone mapped images to low dynamic range (LDR) image data.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8A illustrates an example table with log-space compression values, in accordance with example embodiments.

FIG. 9A illustrates an example table with log-space compression values based on a tuning parameter, in accordance with example embodiments.

FIG. 9B illustrates an example table with digital number (DN) per f-stop values corresponding to the table in FIG. 9A, in accordance with example embodiments.

FIG. 10A illustrates an example table with log-space compression values based on a tuning parameter and a cutoff parameter, in accordance with example embodiments.

FIG. 10B illustrates an example table with digital number (DN) per f-stop values corresponding to the table in FIG. 10A, in accordance with example embodiments.

DETAILED DESCRIPTION

Figure 1:
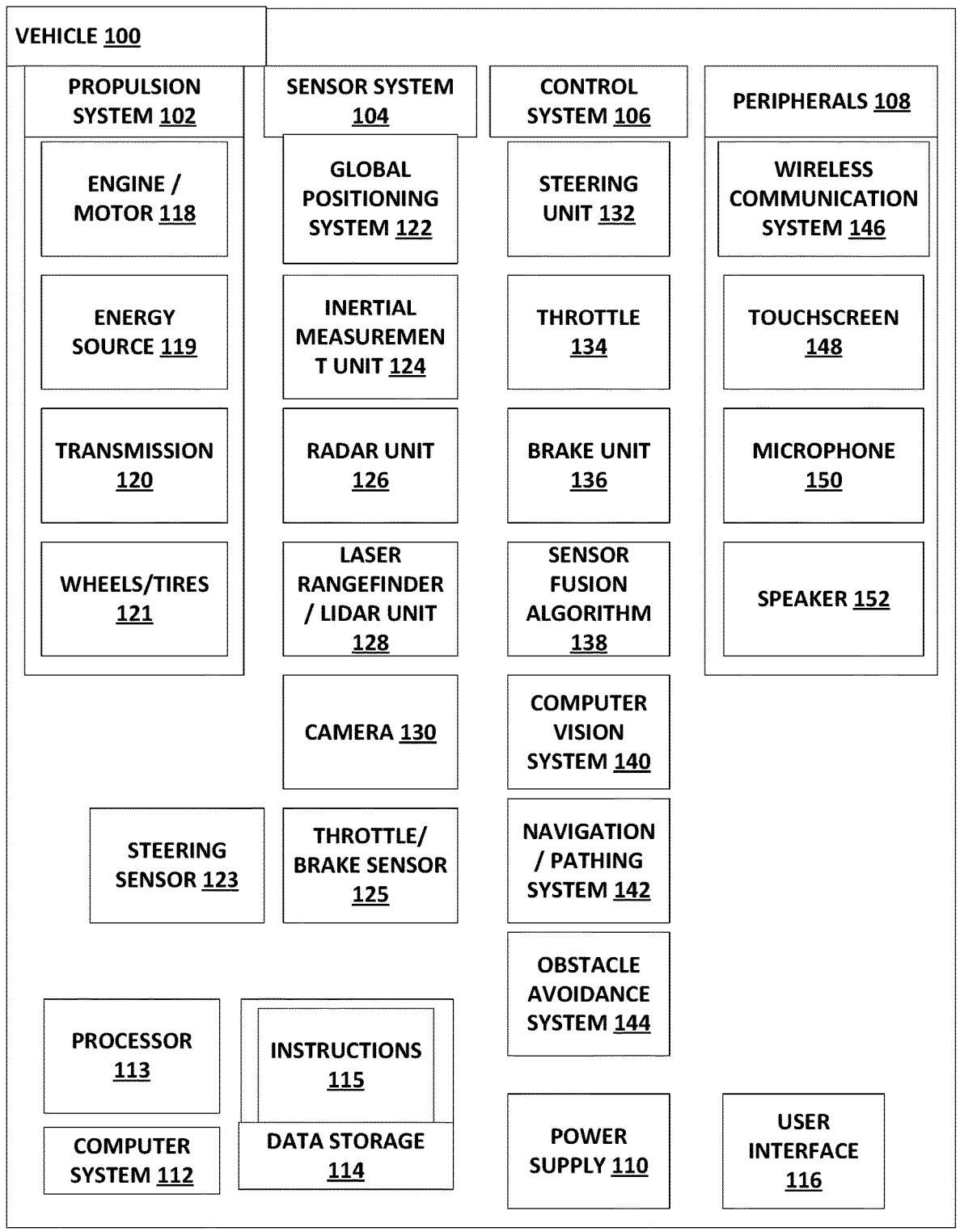
FIG. 1 illustrates a block diagram of a vehicle, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

Overview

Image sensors may be provided on an autonomous vehicle to assist with perception of and navigation through the environment. In some cases, the amount of data transfer bandwidth available on the autonomous vehicle and/or the desired data transfer latency may limit the amount of image data that can be utilized by the control system. In other cases, the amount of processing power provided by the control system may limit the amount of image data that can be processed. Generating and processing a larger amount of image data may, in general, be desirable as it may allow for detection, tracking, classification, and other analysis of objects within an environment surrounding a vehicle.

Complex autonomous driving systems include online and offline image processing for HDR input images. The processed HDR images may be consumed by neural networks for on-device processing in real time, such as, for example, object detection, object tracking, classification, and various other tasks ("online image processing"), while offline-processed images may be generated for human eyes ("offline image processing"). An image of a person in the dark may have a high composition of dark colors with a low luminance value. Another image of vehicle lights or traffic lights may comprise bright colors of high luminance value. In some aspects, a ratio of respective luminance values may have a high dynamic range, for example, 1:1,000,000. In order to capture images of such high dynamic range, the bit depth of the image sensor may be 20 or higher. However, such a high depth value is not conducive for efficient image processing, as is desirable for an autonomous vehicle. Accordingly, the HDR images captured by the camera of a vehicle are tone mapped to reduce the bit depth.

Although images may be globally tone mapped, such a mapping generally applies to each pixel of the entire image. This preserves image data in compressed format, and this may be utilized by neural networks to perform nearly real-time processing of the image. Generally, such online image processing is performed onboard the vehicle. A globally tone mapped image may also be used for logging and/or storage purposes. However, a globally tone mapped image may not be suitable for viewing by human eyes. Therefore, the globally tone mapped image may be locally tone mapped, and/or HDR bracketing may be applied to the globally tone mapped image, for consumption by human vision systems. Generally, in existing systems, global tone mapping and local tone mapping are performed separately, and the workflows for online and offline image processing are different. For example, an incoming data stream is generally duplicated and separated into two workflows for online and offline image processing. This may lead to additional consumption of computational resources such as memory, processor, and so forth, and/or cause delays in processing. However, object detection by an autonomous vehicle is a task where any reduction in time and/or computational resources can have a significant impact on vehicle control and safety.

Examples relate to systems and methods for tone mapping of high dynamic range (HDR) images captured by a camera of an autonomous vehicle. As described herein, a high dynamic range (HDR) input image captured by a camera of an autonomous vehicle may be received and processed by an on-board processing unit (also referred to herein as online image processing). In some aspects, the on-board processing unit may apply a global tone mapping to the image. Global tone mapping may be performed by utilizing a single curve for each pixel of the input image. As described herein, storage, logging, and/or providing to a human vision system may be performed as offline image processing, or by systems that are different from the on-board processing unit of a vehicle. For example, the globally tone mapped image may be stored by an offline image processing usit. In some aspects, the globally tone mapped image may not be suitable for viewing by a human vision system, such as viewing an image by a display device. Accordingly, the offline image processing may involve applying a local tone mapping or HDR bracketing to the globally tone mapped image. Local tone mapping may be performed by applying different curves to different groups of pixels (e.g., pixels corresponding to different regions of the input image).

Such approaches can beneficially avoid duplicating an incoming data stream for separate online and offline image processing workflows, and the same data stream can be utilized for both. While avoiding significant data duplication, such a unified approach also allows for aspects of the workflow to be fine-tuned based on requirements of the end-tasks of neural nets and/or human vision systems. For example, the global and/or local tone mappings may be calibrated based on processing needs.

As described herein, logarithm maps, approximately logarithmic maps, piecewise invertible maps, and so forth may be used to achieve a desired allocation of a number of bits or digital numbers (DNs) to f-stops. Such mappings may be fine-tuned based on a tuning parameter and/or a cutoff parameter. An entire family of mappings may be generated based on such techniques, and one or more suitable mappings may be selected based on a type of an end task (e.g., consumption by a human vision system or a neural network). Also, for example, one or more suitable mappings may be selected based on a type of camera, vehicle, image sensor, available computational resources, display settings of a display device, and so forth.

In example embodiments, global tone mapping may be performed online at the vehicle by mapping the input image (e.g., from linear space to logarithmic space). The mapping may represent an even distribution of a number of bits between a high range portion and a low range portion of the input image. A logarithmic map is invertible, and therefore original data, for example in linear space, may be recovered by applying an inverse transformation. Although a logarithmic mapping can be used, any mapping that approximates a logarithmic mapping may be used as well. For example, a mapping comprising invertible piecewise functions that approximate one or more logarithmic maps may be used. In some aspects, the mapping to the logarithmic space may be achieved by way of a look-up table, and/or by way of a suitable interpolation. A globally tone-mapped image may be provided to deep neural networks for further image processing tasks, such as object detection, motion detection, and so forth.

The term "even distribution" as used herein may generally refer to a distribution of a similar number of bits or digital numbers (DNs) between one or more control points of an image of the one or more images, wherein the one or more control points is based on pixel values of the image. For example, an equal or nearly equal number of bits or DNs may be allocated to each f-stop or control focal point. In some embodiments, an "even distribution" may be an optimal distribution that achieves image processing targets, such as, for example, whether under-exposure is desired or not. In some aspects, an "even distribution" may depend on a type of vehicle, a type of camera, a type of image sensor, a type of image, a type of online image processing (e.g., different levels of global tone mapping may be applied for different neural nets, and/or based on characteristics of transmitting image data), a type of offline image processing (e.g., characteristics of transmitting image data, characteristics of a storage device where the image data may be stored, attributes of a display device where the image data may be displayed, and so forth).

In some aspects, image processing tasks can include determining one or more of geometric properties of an object of interest, a position of the object of interest within the environment, changes in position of the object of interest over time (e.g., velocity, acceleration, trajectory), an optical flow associated with the object of interest, a classification of the object of interest (e.g., car, pedestrian, vegetation, road, sidewalk, etc.), among other possibilities.

Also, for example, local tone mapping may be performed offline by further processing the globally tone-mapped image to convert it to a standard dynamic range (SDR) image. For example, the globally tone-mapped image may be mapped from the logarithmic space to a linear space, and either a single locally tone-mapped image may be generated, or one or more globally tone-mapped image may be generated (e.g., by synthetic HDR bracketing). An output of the local tone mapping of the image may be provided for storage and/or display purposes.

Image sensors and at least a portion of the accompanying circuitry may be implemented as layers of an integrated circuit. This integrated circuit may be communicatively connected to a central control system of the autonomous vehicle. For example, a first layer of the integrated circuit may implement the pixels of the image sensor, a second layer of the integrated circuit may implement image processing circuitry (e.g., high dynamic range (HDR) algorithms, ADCs, pixel memories, etc.) that is configured to process the signals generated by the pixels, and a third layer of the integrated circuit may implement neural network circuitry that is configured to analyze signals generated by the image processing circuitry in the second layer for object detection, classification, and other attributes.

Example Vehicle Systems

Example systems within the scope of the present disclosure will now be described in greater detail. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robotic devices. Other vehicles are possible as well. Further, in some embodiments, example systems might not include a vehicle.

By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems, and methods described herein can function in any of the semi or fully-autonomous modes, e.g., Levels 1-5, which are referred to herein as "autonomous" driving modes. Thus, reference to an autonomous driving mode includes both partial and full autonomy.

Referring now to the figures, FIG. 1 is a functional block diagram illustrating example vehicle 100, which may be configured to operate fully or partially in an autonomous mode. In some examples, vehicle 100 may operate in an autonomous mode by receiving and/or generating control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (which could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber. Some or all of the wheels/tires 121 may be coupled to the transmission 120, and the computer system 112 may be able to receive information about tire pressure, balance and other factors that may impact driving in an autonomous mode.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear).

GPS 122 may include a transceiver operable to provide information regarding the position of vehicle 100 with respect to the Earth.

IMU 124 may have a configuration that uses one or more accelerometers and/or gyroscopes and may sense position and orientation changes of vehicle 100 based on inertial acceleration. For example, IMU 124 may detect a pitch, roll, and/or yaw of the vehicle 100 while vehicle 100 is stationary or in motion. In some embodiments, IMU 124 may include a register that records data from IMU 124 (e.g., an accelerometer), such as the position and orientation changes of vehicle 100 based on inertial acceleration. One or more accelerometers may sense changes in vehicular acceleration, and record each change in a register. The register may make sensor data available to control system 106 and/or computer system 112. Sensor data may then be processed, for example, by utilizing a sensor fusion algorithm 138.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). In some examples, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation. In some embodiments, sensor fusion algorithm 138 may utilize one or more operational response models to execute driving strategy.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. In some aspects, navigation/pathing system 142 may store map information (e.g., highly detailed maps that can be used for navigation). For example, the maps may identify the shape and elevation of roadways, lane markers, intersections, speed limits, cross-walks, merging lanes, road banks, grades, traffic signal devices, buildings, signs, vegetation, real-time traffic information, and so forth. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using Wi-Fi or other possible connections. Wireless communication system 146 may also communicate directly with a device using an infrared link, BLUETOOTH®, or ZIG-BEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. In some embodiments, computer system 112 may receive, from one or more sensors, operational data related to an operation of the autonomous vehicle. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Also, for example, computer system 112 may make a determination about various objects based on a change in acceleration in conjunction with timing data obtained from the lasers or other optical sensors configured to sense objects in a field of view of vehicle 100.

In some embodiments, computer system 112 may receive geographical data related to an anticipated route of the autonomous vehicle. For example, navigation/pathing system 142 may store map information (e.g., highly detailed maps that can be used for navigation). For example, the combination of GPS 122 and the features recognized by computer vision system 140 may be used with map data stored in data storage 114 to determine specific road parameters. Further, radar 126 may also provide information about the surroundings of the vehicle.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
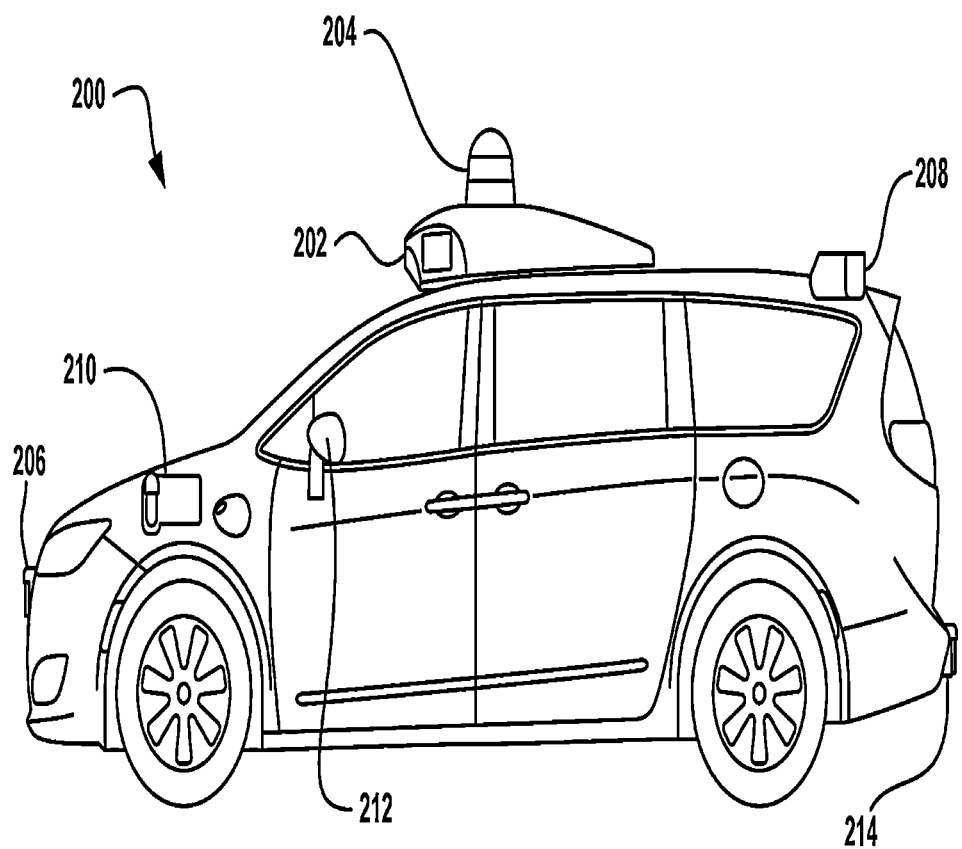
FIG. 2 illustrates a physical configuration of a vehicle, in accordance with example embodiments.

FIG. 2 illustrates a physical configuration of a vehicle, in accordance with example embodiments. In some aspects, FIG. 2 shows an example vehicle 200 that can include some or all of the functions described in connection with vehicle 100 in reference to FIG. 1. Although vehicle 200 is illustrated in FIG. 2 as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a radar unit 208, a LIDAR/radar unit 210, and two additional locations 212, 214 at which an accelerometer, a gyroscope, a radar unit, LIDAR unit, laser rangefinder unit, and/or other type of sensor or sensor(s) could be located on the vehicle 200. The LIDAR/radar unit 210 can take the form of a LIDAR unit, a radar unit, or both.

Furthermore, the example vehicle 200 can include any of the components described in connection with vehicle 100 of FIG. 1. The radar unit 208, and/or the LIDAR units 204, 206 can actively scan the surrounding environment for the presence of potential obstacles and can be similar to the radar 126 and/or laser rangefinder/LIDAR 128 in the vehicle 100. As another example, an accelerometer at location 212 can be similar to the accelerometer included in IMU 124 in the vehicle 100.

Sensor unit 202 may be mounted atop the vehicle 200 and include one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Furthermore, each sensor of sensor unit 202 can be configured to be moved or scanned independently of other sensors of sensor unit 202.

Although not shown in FIG. 2, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. In some embodiments, the sensor may be one or more of: an inertial measurement unit, a roll sensor to measure a body roll, and a pitch sensor to measure pitch data.

Example Smart Sensor

Figure 3:
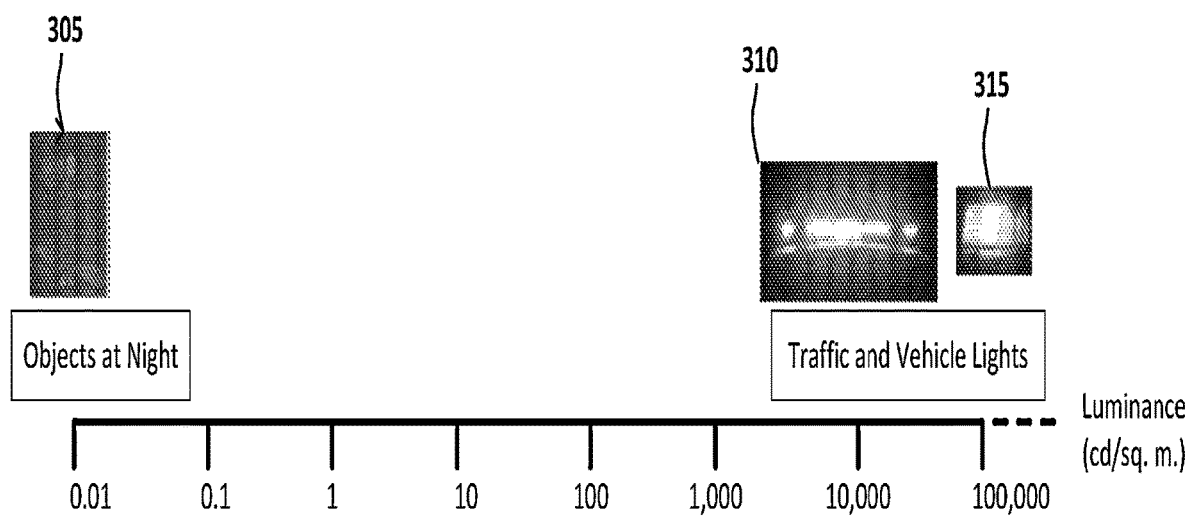
FIG. 3 illustrates example images with a high dynamic range (HDR), in accordance with example embodiments.

FIG. 3 illustrates example images with a high dynamic range (HDR), in accordance with example embodiments. Images captured by a camera of a vehicle may have a high dynamic range. For example, the range may comprise a ratio 1,000,000:1 or higher. As illustrated, a first image 305 of an object (e.g., a person, a stationary object) at night may have a high composition of dark colors with a low luminance value. A second image of vehicle lights 310 (e.g., headlights, taillights, flashing light of an emergency vehicle, a law enforcement vehicle, a towing vehicle, and so forth) or traffic lights 315, may comprise many bright colors of high luminance value. In some aspects, a ratio of respective luminance values may be 0.1 to 100,000, or 1:1,000,000. In order to capture images of such high dynamic range, the bit depth of the image sensor may be 20 or higher. However, such a high depth value is not conducive to fast image processing, as is desirable for an autonomous vehicle. For example, downstream storage and the processing bandwidth and/or cost may be higher than what may be practical for an autonomous vehicle. Also, for example, images may be modified and converted from HDR to standard dynamic range (SDR) for some applications (e.g., human vision). Accordingly, the HDR images captured by the camera are tone mapped to reduce the bit depth.

Figure 4:
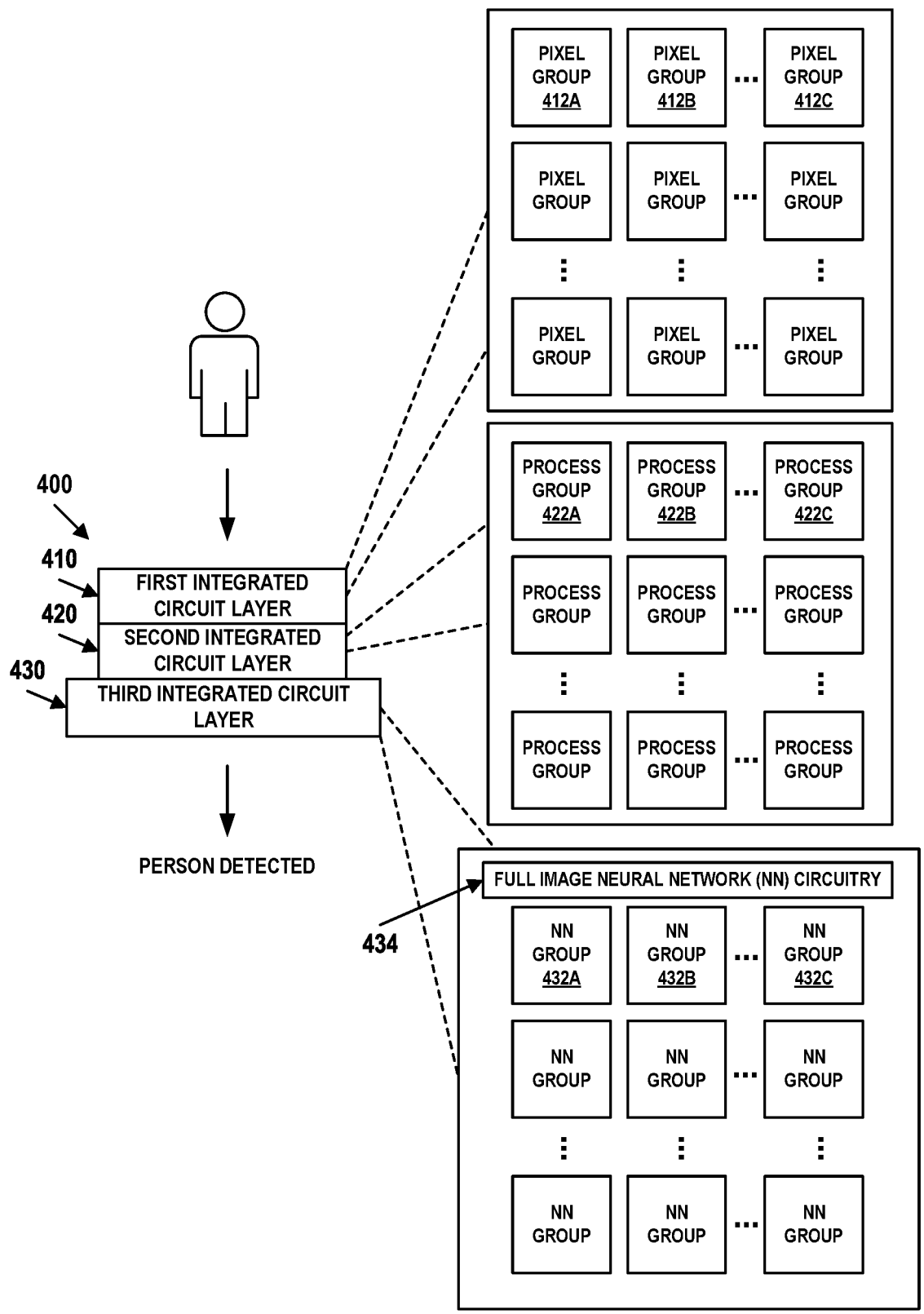
FIG. 4 is a block diagram of an example image sensor, in accordance with example embodiments.

FIG. 4 is a block diagram of an example image sensor 400, in accordance with example embodiments. Image sensor 400 may use the three integrated circuit layers to detect objects. For example, image sensor 400 may capture an image that includes a person and output an indication of "person detected." In another example, image sensor 400 may capture an image and output a portion of the image that includes a vehicle that was detected by image sensor 400.

The three integrated circuit layers include a first integrated circuit layer 410, a second integrated circuit layer 420, and a third integrated circuit layer 430. First integrated circuit layer 410 is stacked on second integrated circuit layer 420, and second integrated circuit layer 420 is stacked on third integrated circuit layer 430. First integrated circuit layer 410 may be in electrical communication with second integrated circuit layer 420. For example, first integrated circuit layer 410 and second integrated circuit layer 420 may be physically connected to one another with interconnects. Second integrated circuit layer 420 may be in electrical communication with third integrated circuit layer 430. For example, second integrated circuit layer 420 and third integrated circuit layer 430 may be physically connected to one another with interconnects.

First integrated circuit layer 410 may have a same area as second integrated circuit layer 420. For example, the length and width of first integrated circuit layer 410 and second integrated circuit layer 420 may be the same while the heights may be different. Third integrated circuit layer 430 may have a larger area than first and second integrated circuit layers 410, 420. For example, third integrated circuit layer 430 may have a length and width that are both twenty percent greater than the length and the width of first and second integrated circuit layers 410, 420.

First integrated circuit layer 410 may include an array of pixel sensors that are grouped by position into pixel sensor groups (each pixel sensor group referred to as "pixel group" in FIG. 4) 412A-412C (collectively referred to by 412). For example, first integrated circuit layer 410 may include a 6400×4800 array of pixel sensors grouped into three hundred twenty by two hundred forty pixel sensor groups, where each pixel sensor group includes an array of 20×20 pixel sensors. Pixel sensor groups 412 may be further grouped to define ROIs.

Each of pixel sensor groups 412 may include 2×2 pixel sensor sub-groups. For example, each of the pixel sensor groups of 20×20 pixel sensors may include ten by ten pixel sensor sub-groups, where each pixel sensor sub-group includes a red pixel sensor in an upper left, a green pixel sensor in a lower right, a first clear pixel sensor in a lower left, and a second clear pixel sensor in an upper right, each sub-group also referred to as Red-Clear-Clear-Green (RCCG) sub-groups.

In some implementations, the size of the pixel sensor groups may be selected to increase silicon utilization. For example, the size of the pixel sensor groups may be such that more of the silicon is covered by pixel sensor groups with the same pattern of pixel sensors.

Second integrated circuit layer 420 may include image processing circuitry groups (each image processing circuitry group referred to as "process group" in FIG. 4) 422A-422C (collectively referred to by 422). For example, second integrated circuit layer 420 may include three hundred twenty by two hundred forty image processing circuitry groups. Image processing circuitry groups 422 may be configured to each receive pixel information from a corresponding pixel sensor group and further configured to perform image processing operations on the pixel information to provide processed pixel information during operation of image sensor 400.

In some implementations, each image processing circuitry group 422 may receive pixel information from a single corresponding pixel sensor group 412. For example, image processing circuitry group 422A may receive pixel information from pixel sensor group 412A and not from any other pixel group, and image circuitry processing group 422B may receive pixel information from pixel sensor group 412B and not from any other pixel group.

In some implementations, each image processing circuitry group 422 may receive pixel information from multiple corresponding pixel sensor groups 412. For example, image processing circuitry group 422A may receive pixel information from both pixel sensor groups 412A and 412B and no other pixel groups, and image processing circuitry group 422B may receive pixel information from pixel group 412C and another pixel group, and no other pixel groups.

Having image processing circuitry groups 422 receive pixel information from corresponding pixel groups may result in fast transfer of the pixel information from first integrated circuit layer 410 to second layer 420 as image processing circuitry groups 422 may physically be close to the corresponding pixel sensor groups 412. The longer the distance over which information is transferred, the longer the transfer may take. For example, pixel sensor group 412A may be directly above image processing circuitry group 422A and pixel sensor group 412A may not be directly above the image processing circuitry group 422C, so transferring pixel information from pixel sensor group 412A to the image processing circuitry group 422A may be faster than transferring pixel information from the pixel sensor group 412A to image processing circuitry group 422C, if there were interconnects between pixel sensor group 412A and image processing circuitry group 422C.

Image processing circuitry groups 422 may be configured to perform image processing operations on pixel information that image processing circuitry groups 422 receives from the pixel groups. For example, image processing circuitry group 422A may perform high dynamic range fusion on pixel information from pixel sensor group 412A and image processing circuitry group 422B may perform high dynamic range fusion on pixel information from pixel sensor group 412B. Other image processing operations may include, for example, analog to digital signal conversion and demosaicing.

Having image processing circuitry groups 422 perform image processing operations on pixel information from corresponding pixel sensor groups 412 may enable image processing operations to be performed in a distributed fashion in parallel by image processing circuitry groups 422. For example, image processing circuitry group 422A may perform image processing operations on pixel information from pixel sensor group 412A at the same time as image processing circuitry group 422B performs image processing operations on pixel information from pixel group 422B.

Third integrated circuit layer 430 may include neural network circuitry groups 432A-432C (each neural network circuitry group referred to as "NN group" in FIG. 4) 432A-432C (collectively referred to by 432) and full image neural network circuitry 434. For example, third integrated circuit layer 430 may include three hundred twenty by two hundred forty neural network circuitry groups.

Neural network circuitry groups 432 may be configured to each receive processed pixel information from a corresponding image processing circuitry group and further configured to perform analysis for object detection on the processed pixel information during operation of image sensor 400. In some implementations, neural network circuitry groups 432 may each implement a convolutional neural network (CNN).

In some implementations, each neural network circuitry group 432 may receive processed pixel information from a single corresponding image processing circuitry group 422. For example, neural network circuitry group 432A may receive processed pixel information from image processing circuitry group 422A and not from any other image processing circuitry group, and neural network circuitry group 432B may receive processed pixel information from image processing circuitry group 422B and not from any other image processing circuitry group.

In some implementations, each neural network circuitry group 432 may receive processed pixel information from multiple corresponding image processing circuitry groups 422. For example, neural network circuitry group 432A may receive processed pixel information from both image processing circuitry groups 422A and 422B and no other image processing circuitry groups, and neural network circuitry group 432B may receive processed pixel information from both image processing circuitry group 422C and another pixel group, and no other pixel groups.

Having the neural network circuitry groups 432 receive processed pixel information from corresponding image processing circuitry groups may result in fast transfer of the processed pixel information from second integrated circuit layer 420 to third integrated circuit layer 430 as neural network circuitry groups 432 may physically be close to the corresponding image processing circuitry groups 422. Again, the longer the distance over which information is transferred, the longer the transfer may take. For example, image processing circuitry group 422A may be directly above neural network circuitry group 432A so transferring processed pixel information from image processing circuitry group 422A to neural network circuitry group 432A may be faster than transferring processed pixel information from image processing circuitry group 422A to neural network circuitry group 432C, if there were interconnects between image processing circuitry group 422A and neural network circuitry group 432C.

Neural network circuitry groups 432 may be configured to detect objects from the processed pixel information that neural network circuitry groups 432 receive from image processing circuitry groups 422. For example, neural network circuitry group 432A may detect objects from the processed pixel information from image processing circuitry group 422A, and neural network circuitry group 432B may detect objects from the processed pixel information from image processing circuitry group 422B.

Having neural network circuitry groups 432 detect objects from the processed pixel information from corresponding image processing circuitry group 422 enables detection to be performed in a distributed fashion in parallel by each of neural network circuitry groups 432. For example, neural network circuitry group 432A may detect objects from processed pixel information from image processing circuitry group 422A at the same time as neural network circuitry group 432B may detect objects from processed pixel information from image processing circuitry group 422B.

In some implementations, neural network circuitry groups 432 may perform intermediate processing. Accordingly, image sensor 400 may use the three integrated circuit layers 410, 420, and 430 to perform some intermediate processing and output just an intermediate result. For example, image sensor 400 may capture an image that includes a person and output an indication of "area of interest in some region of the image," without classifying the at least one object of interest (the person). Other processing, performed outside image sensor 400 may classify the region of interest as a person.

Accordingly, the output from image sensor 400 may include some data representing the output of some convolutional neural network. This data in itself may be hard to decipher, but once it continues to be processed outside image sensor 400, the data may be used to classify the region as including a person. This hybrid approach may have an advantage of reducing required bandwidth. Accordingly, output from neural network circuitry groups 432 may include one or more of selected regions of interest for pixels representing detections, metadata containing temporal and geometrical location information, intermediate computational results prior to object detection, statistical information regarding network certainty level, and classifications of detected objects.

In some implementations, neural network circuitry groups 432 may be configured to implement CNNs with high recall and low precisions. Neural network circuitry groups 432 may each output a list of objects detected, where the object was detected, and timing of detection of the object.

Full image neural network circuitry 434 may be configured to receive, from each of neural network circuitry groups 432, data that indicates objects that neural network circuitry groups 432 detected and detect objects from the data. For example, neural network circuitry groups 432 may be unable to detect objects that are captured by multiple pixel groups, as each individual neural network circuitry group may only receive a portion of processed pixel information corresponding to the object. However, full image neural network circuitry 434 may receive data from multiple neural network circuitry groups 432 and may thus be able to detect objects sensed by multiple pixel groups. In some implementations, full image neural network circuitry 434 may implement a recurrent neural network (RNN). The neural networks may be configurable, both in regard to their architecture (number and type of layers, activation functions, etc.) as well as in regard to the actual values of neural network components (e.g. weights, biases, etc.)

In some implementations, having image sensor 400 perform processing may simplify a processing pipeline architecture, provide higher bandwidth and lower latency, allow for selective frame rate operations, reduce costs with the stacked architecture, provide higher system reliability as an integrated circuit may have fewer potential points of failure, and provide significant cost and power savings on computational resources.

Example Online and Offline Image Processing Workflows

Figure 5A:
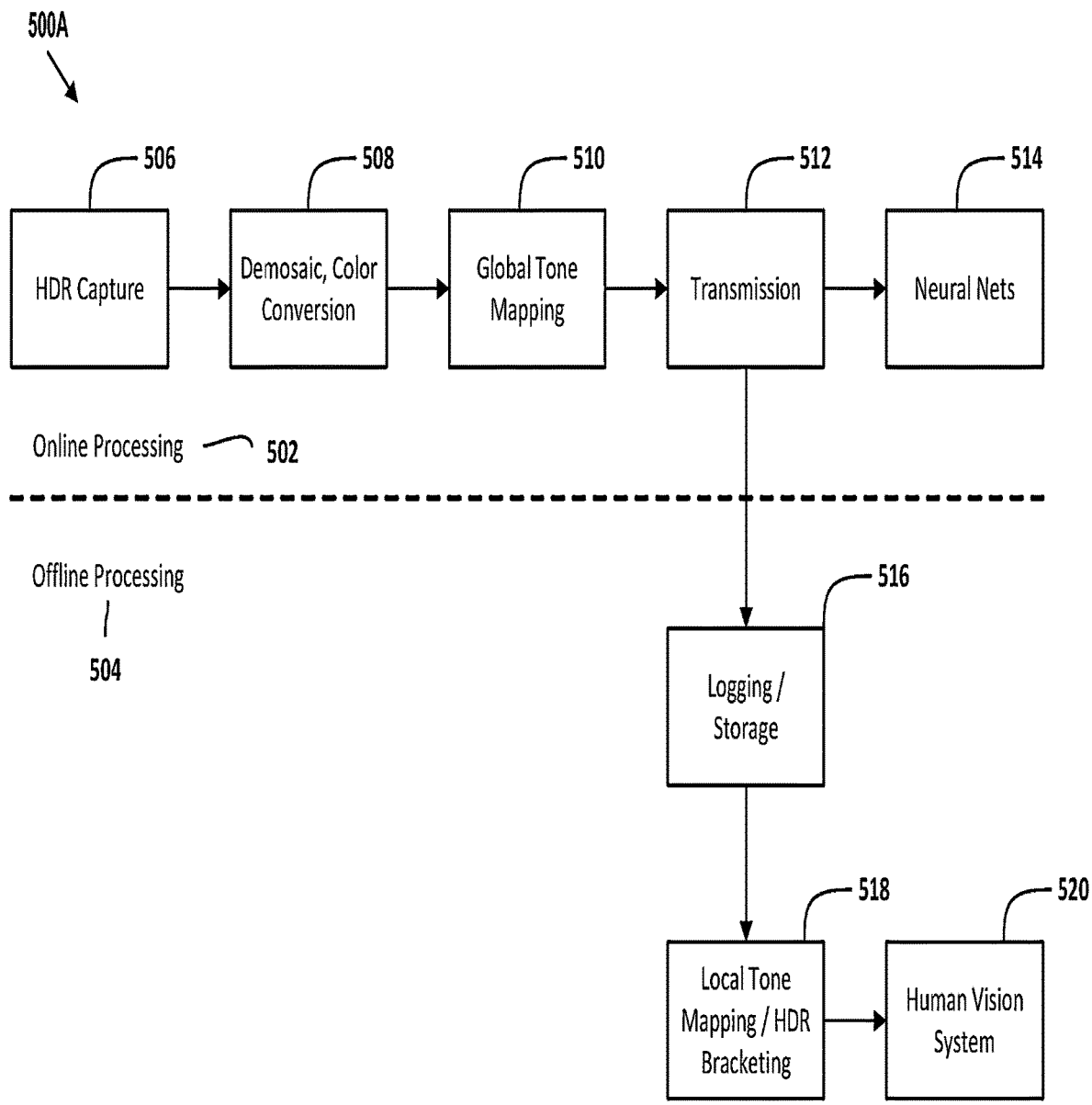
FIG. 5A illustrates example online and offline image processing workflows, in accordance with example embodiments.

FIG. 5A illustrates example online and offline image processing workflows 500A, in accordance with example embodiments. For example, online image processing 502 may be performed in real-time as an image is received. In some embodiments, online image processing 502 may enable processed HDR images to be consumed by deep neural networks 514 on-device in real time. Also, for example, offline image processing 504 may be performed by storing an output of online image processing 502. In some embodiments, offline image processing 504 may enable processed HDR images to be stored and/or logged by storage devices, and/or consumed by human vision systems 520, such as display devices.

In some embodiments, processor 113 may be configured to perform operations that involve receiving, from an image sensor, an input stream including high dynamic range (HDR) image data associated with an environment of the vehicle. The input stream may include one or more images, such as input image 506 (e.g., a high bit depth raw image). Processor 113 may, in some aspects, be configured to perform operations that involve pre-processing tasks such as demosaicing and/or color conversion 508 (e.g., conversion to a high bit depth RGB image). Generally, two types of tone mapping operators may be applied in HDR image processing: global tone mapping 510 and local tone mapping 518. Accordingly, processor 113 may be configured to perform operations that involve applying a global tone mapping 510 to the input image 506 (or to an image after preprocessing 508 is performed), wherein the global tone mapping 510 allocates bits between one or more control points of image 506 of the one or more images, wherein the one or more control points is based on pixel values of the image 506. For example, the global tone mapping 510 may allocate bits to each control point or f-stop of a plurality of f-stops of the input image 506, for example, to provide an even distribution of bits across the plurality of f-stops of the input image 506. Image data for human consumption differs from image data for consumption by neural networks. For example, it may be preferable that image data provided to neural networks include as much information as possible so that the neural network may properly process the image data. Accordingly, global tone mapping 510 may be applied to the input image 506. However, there may be a limited number of bits available to store an HDR image.

In some embodiments, global tone mapping 510 may be performed by applying a logarithmic or an approximate logarithmic mapping. Applying a logarithmic or an approximate logarithmic mapping has several advantages. For example, a first image of an object may be captured under a high brightness illumination setting and a second image of the same object may be captured under a low brightness illumination setting. When the raw image values are mapped from a linear space to log-space by applying a logarithmic mapping (or approximate log-space by applying an approximate logarithmic mapping), the resulting mapped first and second images may look identical, except for a constant offset in their respective mapped values. In linear space however, some aspects of the first image may have luminance values between 2000 and 4000, whereas some aspects of the second image may have luminance values between 4 and 8. However, the underlying object is the same, and so log-space enables viewing of the underlying object in the image without the illumination such as respective high brightness or low brightness illumination settings. For example, adding a constant offset to luminance values in log-space enables a large variation in luminance values in the linear space. Therefore, a large amount of information relevant to the underlying object may be stored and processed in the log-space. This may be especially beneficial for neural nets 514.

For example, in a linear image with luminance values ranging from 0 to 4095, the values in the range 2000 to 4000, representing brighter portions of the image, comprise a single f-stop. This is a large allocation of bits to a range of brightness values that may not include very much useful information (e.g., differences in image data may be imperceptible for such high brightness regions). On the other hand, values in the range 4 to 8, representing darker portions of the image, comprise a single f-stop. However, 4 bits may not be sufficient to store useful information about low brightness regions (e.g., a person in dark clothing during the night). Therefore, an uneven distribution of bits, 2000 to 4, for these respective f-stops may not be desirable for image processing tasks. Accordingly, a logarithmic mapping may be used to map image data from a linear space to a logarithmic space to achieve an even distribution of bits between f-stops. Logarithmic mappings are also invertible, and preserve information. Therefore, applying an inverse operation may enable retrieval of image data, for example, by mapping the image data from logarithmic space to linear space.

The term "control point" or "f-stop" as used herein may refer to a pixel intensity value or a plurality (or range) of pixel intensity values. In traditional photography, adjusting a camera's aperture by 1 f-stop allows twice as much light to enter, and decreasing by 1 f-stop allows half of the light to enter. When an image is captured, individual linear pixel values may range from 0 to a white level, where the white level is the brightest possible input value in a captured image. This may depend on how much light was sensed during the exposure, at that pixel. The term "control point" or "f-stop" is used herein to describe this range of values. Generally, a "brightest" f-stop may describe pixels that fall between 50% to 100% of the white level. The next brightest f-stop may describe pixels that fall between 25% to 50% of the white level, the next f-stop may describe pixels that fall between 12.5% to 25% of the white level, and so forth. Although infinitely many f-stops may be described, in practice, only a limited number of meaningful "f-stops" are captured, due to a numerical precision of an incoming signal. In some embodiments, a digital image sensor that captures ten linear bits can be considered to have captured ten f-stops, although a distribution of a number of bits across these f-stops may vary. For example, half of the entire range of bits are allocated to the brightest f-stop, and very few bits are allocated to the darkest f-stop.

Generally, due to a high dynamic range of the input image 506, there may be a high variance in a number of bits allocated to different f-stops. Accordingly, global tone mapping 510 may be applied to the input image 506 to allocate a more even distribution of bits across various f-stops. Applying global tone mapping 510 may involve applying a map to every pixel of image 506. A globally tone mapped image may be free of halos and/or other artifacts. Applying global tone mapping 510 is generally a fast and simple process. Also, for example, a globally tone mapped image may be suitable for consumption by neural nets 514. Accordingly, in some embodiments, after applying global tone mapping 510, online transmission 512 of the low bit depth image (e.g., a low bit depth RGB image) may occur, and the globally tone mapped image may be provided to neural nets 514 for online image processing at the vehicle (e.g., vehicle 100). For example, a globally tone mapped low bit depth data in RGB or YUV format may be passed through transmission 512 and may be provided to neural nets 514 as part of online image processing 502 at vehicle 100.

However, a globally tone mapped image may not be suitable for consumption by human vision system 520, such as standard dynamic range (SDR) images. Accordingly, in some embodiments, offline image processing 504 may be performed. For example, after applying global tone mapping 510, online transmission 512 of the image may occur, and the globally tone mapped image may be provided for logging and/or storage 516. For example, a globally tone mapped low bit depth data in RGB or YUV format may be passed through transmission 512 and may be provided to logging and/or storage 516. Logging/storage 516 may be performed to store an image for later retrieval, for example, to be used as synthetic data for future simulations.

Generally, transmission 512 may or may not involve compressed data. The physical media for transmission may be of various standards, including, but not limited to, Mobile Industry Processor Interface (MIPI), Gigabit Multimedia Serial Link™ (GMSL), flat panel display (FPD), Ethernet, or Fiber.

In some embodiments, processor 113 may be configured to perform operations that involve applying local tone mapping 518 to map the globally tone mapped image to transform the one or more globally tone mapped images to low dynamic range (LDR) image data. For example, the globally tone mapped image may be retrieved from logging/storage 516 and an inverse of a mapping utilized in global tone mapping may be applied. Subsequently, local tone mapping 518 may be applied. For example, local tone mapping 518 may be applied based on different gain amounts and/or curves applied to different regions. Generally, local tone mapping 518 reduces global contrast while preserving local contrast, thereby preserving image details. As another example, local tone mapping 518 can render a scene without crushed shadows or clipped highlights, and while preserving local contrast. One advantage of a locally tone mapped image is that it may be consumed by a human vision system 520 displaying images for human viewing, such as an SDR display. However, local tone mapping 518 may introduce halo artifacts in extreme high contrast areas, and the processing may be slow and complex. Although locally tone mapped images may be provided to neural nets 514 for online image processing, such images may not be useful for neural nets 514 as some pertinent information may have been lost in processing.

As described in FIG. 5A, a combination of online image processing 502 and offline image processing 504 may be utilized to provide globally tone mapped images to neural nets 514 for online image processing 502 at the vehicle, and provide the one or more globally tone mapped images for offline image processing 504. The offline image processing 504 may include applying a local tone mapping 518 to the one or more globally tone mapped images. The local tone mapping may transform the one or more globally tone mapped images to low dynamic range (LDR) image data. LDR data is generally suitable for consumption by human vision system 520. Generally, display devices that display images for human consumption are configured for 8 bits. Accordingly, in some embodiments, the HDR input image 506 may be of 20-24 bits, global tone mapping may compress this image to 10-14 bits (and provide the compressed image to neural nets 514 and logging/storage 516). However, local tone mapping/HDR bracketing 518 may be performed to further decrease the image to 8 bits to make it suitable for consumption by human vision system 520.

In some embodiments, online image processing 502 may involve tasks such as, for example, object detection, object tracking, and/or classification. For example, online image processing 502 may involve determining one or more of: (i) geometric properties of at least one object of interest, (ii) a position of at least one object of interest within the environment, (iii) a speed of at least one object of interest, (iv) an optical flow associated with at least one object of interest, or (v) a classification of at least one object of interest.

Figure 5B:
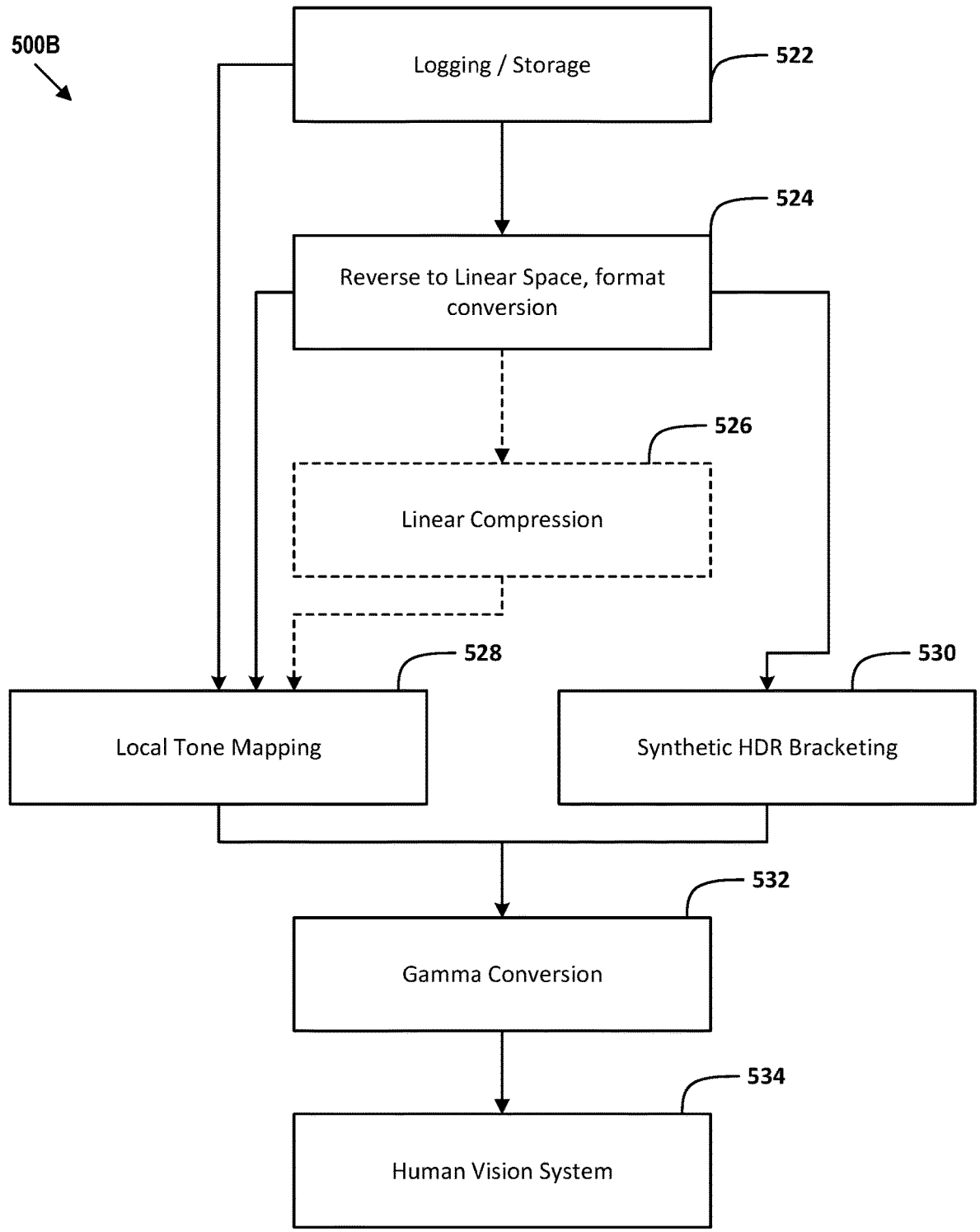
FIG. 5B illustrates an example offline image processing workflow, in accordance with example embodiments.

FIG. 5B illustrates an example offline image processing workflow 500B, in accordance with example embodiments. For example, one or more aspects of offline image processing 504 of FIG. 5A are illustrated. At block 522, logging and/or storage of a globally tone mapped image may be performed. Such logging and/or storage may be performed, for example, to store the image for later use, such as, for example, in generating synthetic data for simulations. At block 524, the image may be converted back to linear space (e.g., decompressed from log-space to linear space). For example, global tone mapping may involve applying a logarithmic mapping to each pixel of the input image to map the input image to a log-space. Accordingly, at block 524, the image may be converted from log-space back to linear space by applying appropriate inverse transformations. For example, an image with a bit depth of 20-bits may be converted to an image with a bit depth of 12-bits after global tone mapping is applied. Accordingly, when the image is converted from log-space back to linear space, the bit depth may change from 12-bits to 20-bits. In some embodiments, the image may be converted to RGB or YUV format.

In some embodiments, at block 526, linear compression may be applied to the converted image in linear space. The boundary of block 526, and the arrows connecting block 524 to block 526, and block 526 to 528 are displayed with dashed lines to indicate that block 526 may be an optional step in the offline processing. Linear compression may be an optional part of the local tone mapping process after the image is transformed into the linear domain (through the linear decompression). For example, a bit depth for the image may be 12-bits after log tone mapping is applied. After linear decompression is performed, the bit depth may be 20-bits. However, this may be a very high bit-depth for traditional local tone mapping algorithms, and one option may be to perform linear domain compression (for example: 20-bits to 16-bits), and then perform local tone mapping (e.g., at block 528).

In some embodiments, at block 528, local tone mapping may be applied to the transformed image. As noted, block 526 may be optional, and in such embodiments, the process may proceed from block 524 directly to block 528. In some embodiments, at block 528, the globally tone mapped image may be retrieved and local tone mapping may be applied to the retrieved image. In some embodiments, the local tone mapping may involve applying a first map to a first portion of the globally tone mapped image, and applying a second map to a second portion of the globally tone mapped image.

In some embodiments, at block 530, synthetic HDR bracketing may be performed on the converted image in linear space. At block 532, gamma conversion may be applied to an output of block 528 and block 530. At block 534, the converted image may be provided to the human vision system. A gamma conversion is generally applied to make images suitable for display devices, and then for viewing by humans. In some embodiments, one or more gamma curves may be hardcoded into the device. Generally, to generate different synthetic exposures, different gains (global scalar multipliers) may be applied to a linear image, and subsequently, a typical gamma curve may be applied to the gained linear images.

Figure 6:
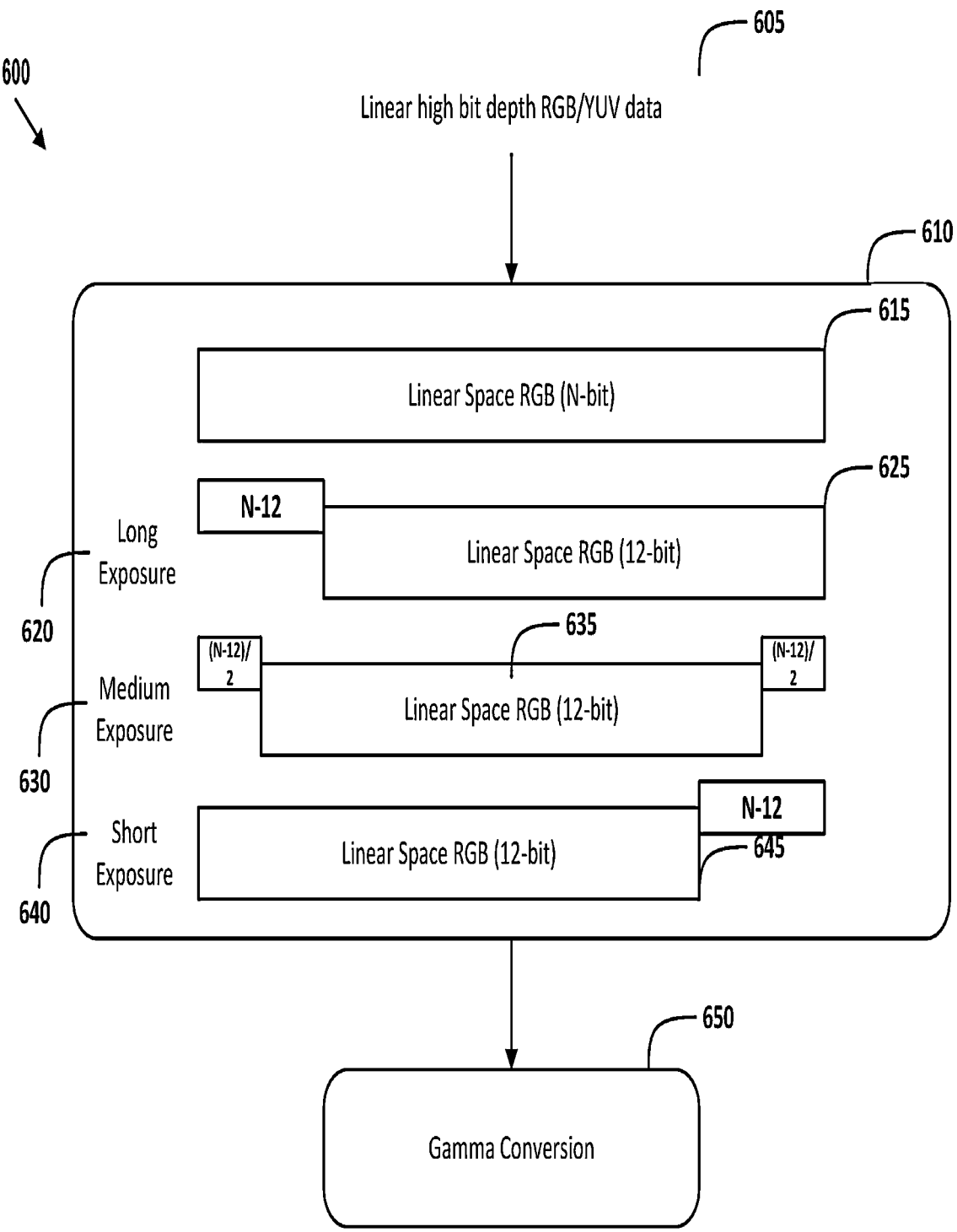
FIG. 6 illustrates an example of HDR bracketing, in accordance with example embodiments.

FIG. 6 illustrates an example of HDR bracketing 600, in accordance with example embodiments. The term "bracketing" as used herein, refers to generating a plurality of images, each with a different image characteristic, such as, for example, an exposure setting, a focus setting, and so forth. For example, a plurality of images may be generated for specific HDR range brackets, and such images may be combined to generate an HDR image. In some embodiments, synthetic HDR Bracketing 610 may use high bit depth linear space RGB/YUV data 605 as input (e.g., blocks 524 and 530 of FIG. 5B), and generate multiple outputs to emulate HDR burst capture with exposure bracketing. For example, a first image 625 representing long exposure 620, a second image 635 representing medium exposure 630, and a third image 645 representing short exposure 640, may be generated. For example, when linear space RGB data 615 comprises N-bits, first image 625 may be a linear space RGB data comprising 12 bits, where N−12 bits have been truncated from an initial portion of the linear space RGB data 615. Also, for example, second image 635 may be a linear space RGB data comprising 12 bits, where N−12 bits have been truncated, with (N−12)/2 bits truncated from an initial portion of the linear space RGB data 615, and with (N−12)/2 bits truncated from a terminal portion of the linear space RGB data 615. As another example, third image 645 may be a linear space RGB data comprising 12 bits, where N−12 bits have been truncated from a terminal portion of the linear space RGB data 615.

In some embodiments, gamma conversion 650 may be applied to the truncated 12-bit linear space RGB data, and the gamma-converted data may be provided via a display, to be viewed by human eyes.

Additional and/or alternative HDR bracketing techniques may be applied. For example, the bit size may change, a number of brackets may change, and/or image settings other than luminance settings may be utilized.

Example Global and Local Tone Mappings

Figure 7:
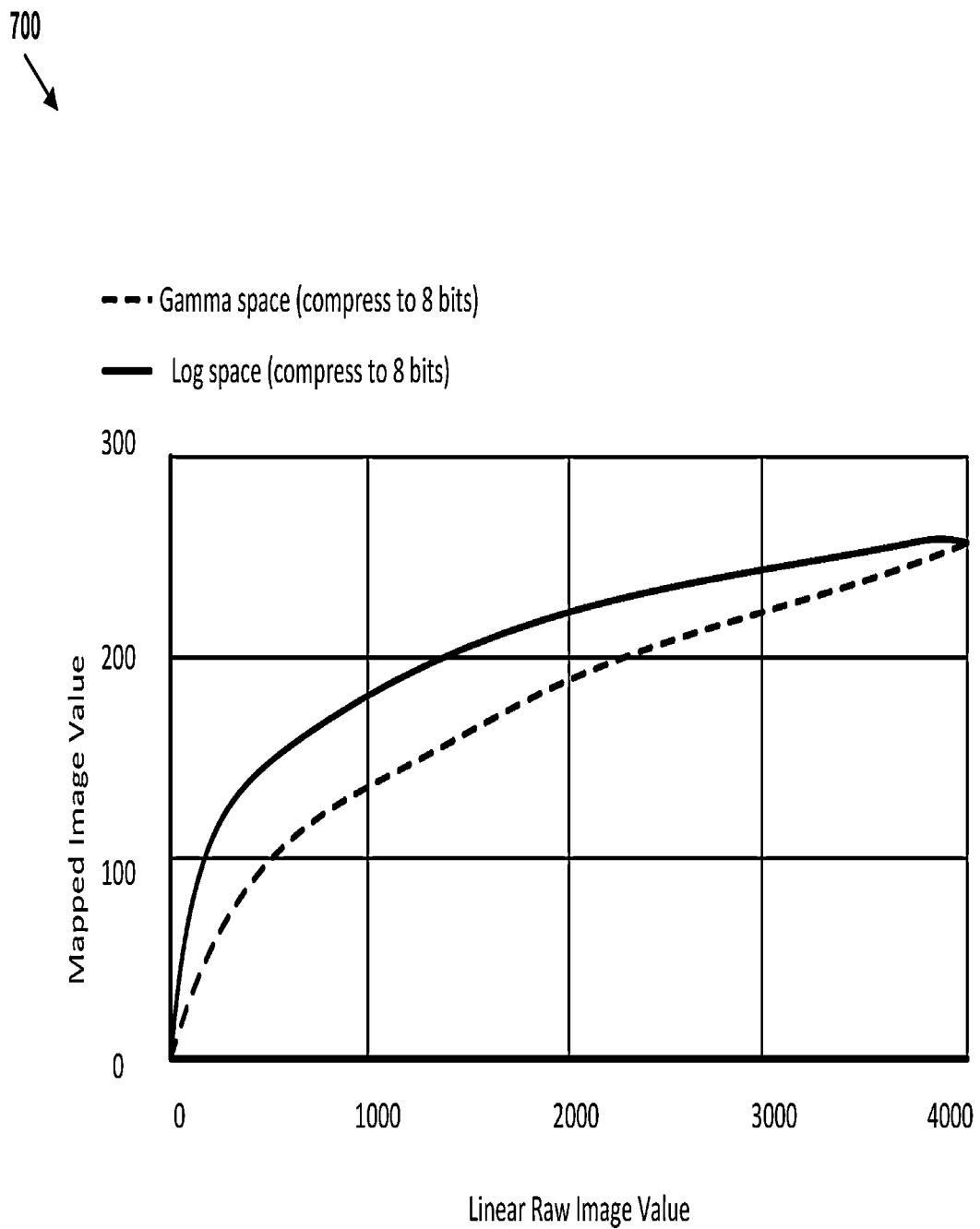
FIG. 7 illustrates an example log-space compression, in accordance with example embodiments.

FIG. 7 illustrates an example log-space compression 700, in accordance with example embodiments. In some embodiments, the applying of the global tone mapping may involve applying a logarithmic map, an approximate logarithmic map, or a piecewise combination of such maps, to every pixel of the image. As illustrated, the horizontal axis represents linear raw image values with a range from 0 to 4095 representing 12-bits, and the vertical axis represents transformed values with a range from 0 to 255 representing 8-bits. For example, transformed values based on a gamma mapping are shown with a dashed curve, and transformed values based on a logarithmic mapping are shown with a solid curve.

In some embodiments, for online image processing using a log-space global tone mapping, hardware acceleration may be utilized to reach real time performance. In some embodiments, a complexity of a logarithmic calculation within a hardware implementation may be reduced. For example, a first Look-Up-Table (LUT) may be used for a lower bit-depth tone mapper. The LUT may be used to apply an appropriate curve. Also, for example, a second Look-Up-Table (LUT) with interpolation (e.g., linear, quadratic, cubic, and so forth) may be used for a higher bit-depth tone mapper (e.g. a 20 bits to 12 bits mapping, a 20 bits to 8 bits mapping, and so forth). Generally, each LUT is a register in some hardware device, and registers are generally expensive. Accordingly, reducing the size of LUTs is desirable to reduce costs as well as memory and processing resources.

FIG. 8A illustrates an example table 800A with log-space compression values, in accordance with example embodiments. Table 800A comprises columns C1 to C6 and rows R1 to R14. Column C1 displays an entry for each f-stop in a linear raw image. Column C2 represents the linear raw image values corresponding to the brightest linear value in the range of each f-stop. For example, in row R5, the third f-stop (in column C1) corresponds to a value of $2^3=8$ (in column C2).

Column C3 displays compressed values corresponding to a gamma curve. At a time of display, a display device may apply a curve (e.g., $x^{2.2}$) to an image prior to display. Accordingly, a gamma curve (e.g., $x^{(1/2.2)}$) may be applied when transforming raw images, to invert the transformation performed prior to the display. Although storing images in such a "gamma space" offers a more even distribution of precision among the f-stops than in linear space, it may not be as good as in log space. Column C4 displays approximate differences in the gamma-compressed values for successive rows in column C3. For example, in column C3, row R3 has a value 8 and row R4 has a value 11, with a difference of 11−8=3, which is displayed in column C4, row R4. As another example, in column C3, row R9 has a value 53 and row R10 has a value 72, with a difference of 72−53=19, and an approximate difference of 20 is displayed in column C4, row R10. Column C4 is indicative of a precision of each f-stop, such as a number of possible encoded values within the f-stop for gamma-compressed values. As illustrated in column C4, the number of DNs ranges from 2 to 69 across the plurality of f-stops.

Column C5 displays compressed values corresponding to a logarithmic curve. Column C6 displays approximate differences in the gamma-compressed values for successive rows in column C5. For example, in column C5, row R3 has a value 3 and row R4 has a value 5, with a difference of 5−3=2, and an approximate difference of 3 is displayed in column C6, row R4. As another example, in column C5, row R9 has a value 84 and row R10 has a value 115, with a difference of 115−84=31, which is displayed in column C6, row R10. Column C6 represents a change in the number of digital numbers (DNs) between successive f-stops for log-compressed values. As illustrated in column C6, the number of DNs ranges from 2 to 36 across the plurality of f-stops, a smaller range than the corresponding range of 2 to 69 for gamma-compressed values. Column C6 is generally indicative of a precision of each f-stop, such as a number of possible encoded values within the f-stop.

Figure 8B:
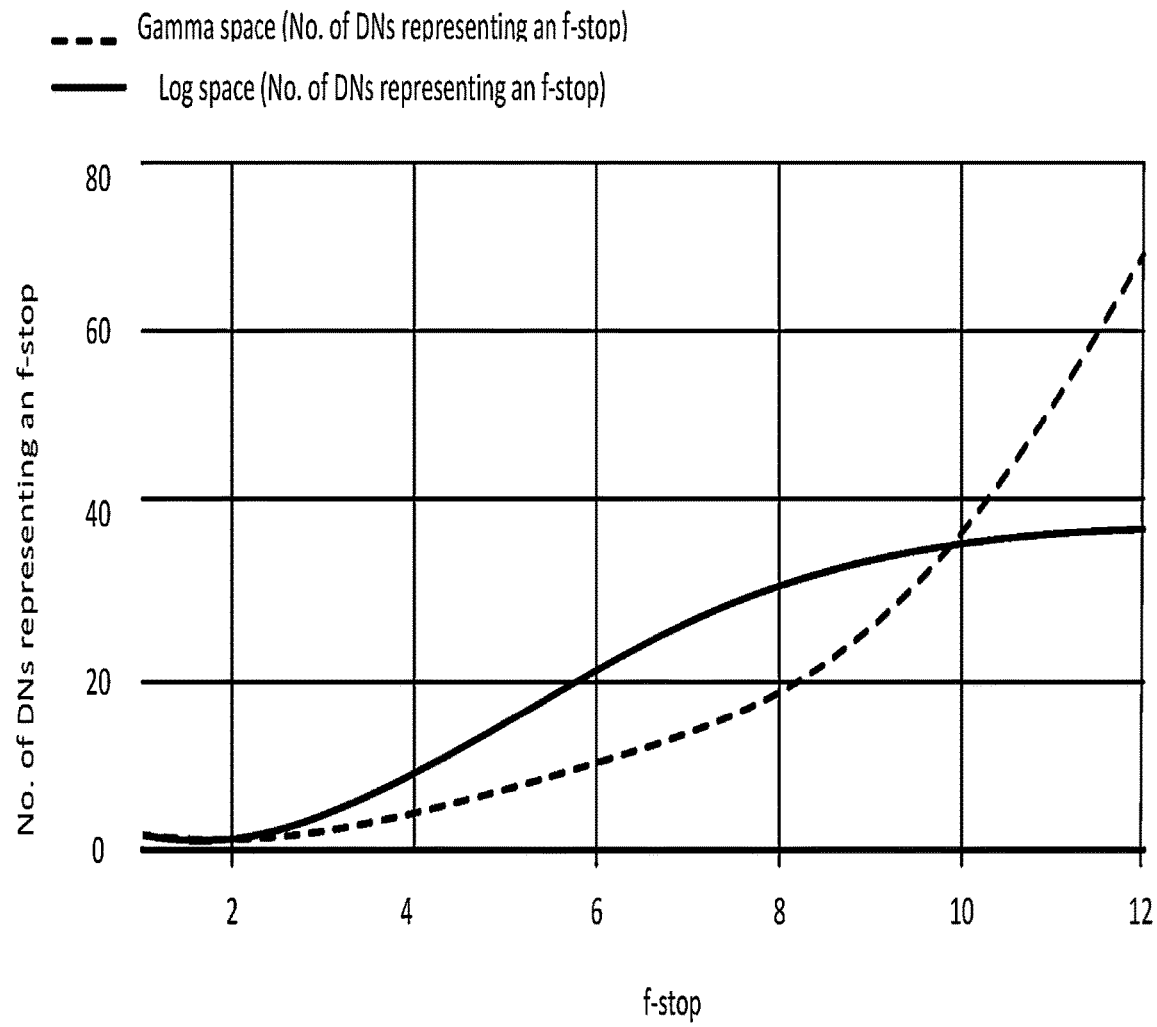
FIG. 8B illustrates an example graphical representation comparing log-space compression and gamma-space compression, in accordance with example embodiments.

FIG. 8B illustrates an example graphical representation 800B comparing log-space compression and gamma-space compression, in accordance with example embodiments. The horizontal axis represents consecutive f-stops of the captured image, with values ranging from 0 to 12, and the vertical axis represents the number of DNs representing that f-stop, with values ranging from 0 to 80. For example, the dashed curve represents the number of DNs for gamma curve corresponding to gamma-compressed values (e.g., values from column C4 of table 800A), and the solid curve represents the number of DNs for log curve corresponding to log-compressed values (e.g., values from column C6 of table 800A). The lower f-stop values are representative of darker regions of an image, and the higher f-stop values are representative of brighter regions of an image. Generally, the desirable distribution for the number of DNs per f-stop is a straight horizontal line, indicative of a uniform distribution of the number of DNs across all f-stops. This would indicate that darker and brighter regions of an image are allocated similar precision.

As illustrated in graphical representation 800B, a typical gamma curve, represented by the dashed curve, has a small number of DNs for smaller f-stop values, and a relatively large number of DNs for larger f-stop values. Accordingly, brighter regions, corresponding to larger f-stop values, may be allocated higher precision. Also, for example, darker regions, corresponding to smaller f-stop values, may be allocated lower precision. By comparison, the log curve, represented by the bold curve, represents a more even distribution of bits across the different f-stops, thereby attributing a more similar level of precision to brighter and darker regions of the image.

Although a logarithmic mapping is used herein for illustrative purposes, any mapping, or a combination of mappings, may be used to achieve an even distribution of the bits across f-stops. In some embodiments, the particular mapping applied may depend on a type of image, a time of day, and so forth. Also, for example, the techniques described herein may be applied to a portion of an image, for example, a region of interest (ROI).

FIG. 9A illustrates an example table 900A with log-space compression values based on a tuning parameter, in accordance with example embodiments. In some embodiments, the logarithmic map may include a tuning parameter. A higher value of the tuning parameter may be indicative of a less even distribution of the bits between the one or more control points. The term "less even" as used herein may generally refer to a distribution of a dissimilar number of bits or digital numbers (DNs) between one or more control points of an image of the one or more images, wherein the one or more control points is based on pixel values of the image. For example, a number of bits or DNs allocated to different f-stops or control points may vary.

Generally, log 0 is not defined, and an offset parameter, such as an epsilon or a tuning parameter may be utilized to avoid such situations. In some aspects, allocating a smallest possible value to epsilon may be sufficient to serve as an offset parameter. However, this may not be desirable. For example, for a small epsilon, luminance values between 1E-9 and 2E-9 may correspond to an f-stop, and a large number of bits may be allocated to this f-stop that represents an extremely dark portion of the image. However, useful information stored for this f-stop may be very small or non-existent (e.g., a completely dark portion of the image). For example, a camera may not be configured to provide this level of precision, and therefore an unnecessary allocation of bits may occur. Accordingly, selecting a value for the tuning parameter may also depend on a desired allocation of bits to f-stops.

An allocation of f-stops may be determined by determining a range from a high brightness value to a low brightness value, where these respective brightness values represent useful image data. For example, luminance values between 1E-9 and 2E-9 may not include useful information as these portions may represent black space. As another example, in a bracketing operation, 14 bits of an image may be received. Accordingly, a reasonable precision is desirable for the 14th f-stop to have a sufficient number of bits to store useful information. Accordingly, epsilon may be selected to achieve a desired number of bits (or DNs) corresponding to the 14th f-stop. As indicated, for a given camera, luminance range of an image received are predictable, and therefore, a suitable choice of epsilon may be made and hardcoded during a manufacturing process. Choices for epsilon may be different for different cameras.

As illustrated in table 900A, the tuning parameter is labeled as "epsilon" 902 and various values of epsilon 902 are represented, for example, 0.00001 corresponding to column A, 0.0003 corresponding to column B, 0.0007 corresponding to column C, 0.0015 corresponding to column D, 0.0035 corresponding to column E, 0.01 corresponding to column F, and 0.03 corresponding to column G.

Column C1 represents values of a linear input, with linear input values from 0 to 255. Column C2 represents a remapping of the values in column C1, normalized to be between 0 and 1. For example, in row 9AR2, the renormalized or remapped value in column C2 corresponding to the value 0.125 in column C1 is 0. As another example, in row 9AR3, the renormalized or remapped value in column C2 corresponding to the value 0.25 in column C1 is 0.001. Each of columns A through G represent globally tone mapped (log-compressed) values corresponding to the respective tuning parameter or epsilon. For example, the globally tone mapped (log-compressed) values may be generated based on a logarithmic mapping such as:

$$\frac{\log(\text{remapped} + \text{epsilon}) - \log(\text{epsilon})}{\log(1 + \text{epsilon}) - \log(\text{epsilon})} * 255$$

In some embodiments, the "remapped" value in Eqn. 1 may correspond to the values in column C2 of table 900A, and the "epsilon" values are from epsilon 902. As epsilon changes, entries in each column are generated based on Eqn. 1. Although logarithm with base 10 has been used for illustrative purposes, any base may be utilized. The last column in table 900A corresponds to the gamma-compressed values.

FIG. 9B illustrates an example table 900B with digital number (DN) per f-stop values corresponding to the table in FIG. 9A, in accordance with example embodiments. For example, columns C1 and C2 represent a range for bit values. For example, row 9BR1 corresponds to bit values between linear input value 0 and 0.125, row 9BR2 corresponds to bit values between linear input value 0.125 and 0.25, and so forth. Columns A through G of table 900B correspond to columns A through G of table 900A, and each column represents DNs per f-stop, which may be approximately determined as a difference of the values in successive rows of a respective column in table 900A.

For example, referring to table 900B, the entry in column A and row 9BR1 is 87. Now referring to table 900A, the entry in column A, row 9AR1 is 0, and the entry in column A, row 9AR2 is 87, and the difference 87−0=87 is the entry in column A and row 9BR1 of table 900B.

As another example, referring to table 900B, the entry in column D and row 9BR3 is 13. Now referring to table 900A, the entry in column D, row 9AR3 is 20, and the entry in column D, row 9AR4 is 33, and the difference 33−20=13 is the entry in column D and row 9BR3 of table 900B. Entries for the DNs for the gamma compression may be determined in a similar manner with reference to successive rows of the gamma curve column of table 900A.

To select a desirable value for the tuning parameter, epsilon, one or more factors may be considered. For example, a variance for each column may be determined. The variance is indicative of a relative distribution of the DNs across f-stops. Accordingly, a column with a low variance indicates a uniform distribution of DNs. As another example, an average of values in each column may be determined. The average indicates an average number of DNs per f-stop, for example, a ratio of a number of DNs in a total output range to a number of f-stops that may be of significance for a particular image processing process. Accordingly, a column with a high average value indicates a greater number of DNs allocated per f-stop. Also, for example, when under-exposure is not desired, then values in the bottom entries of a column may be more considered. However, when stronger under-exposure is desired, then values in all the entries in the column may be considered. As indicated, an even distribution of the bits across f-stops may be an optimal distribution based on factors such as a high average value, a low variance, and so forth.

Figure 9C:
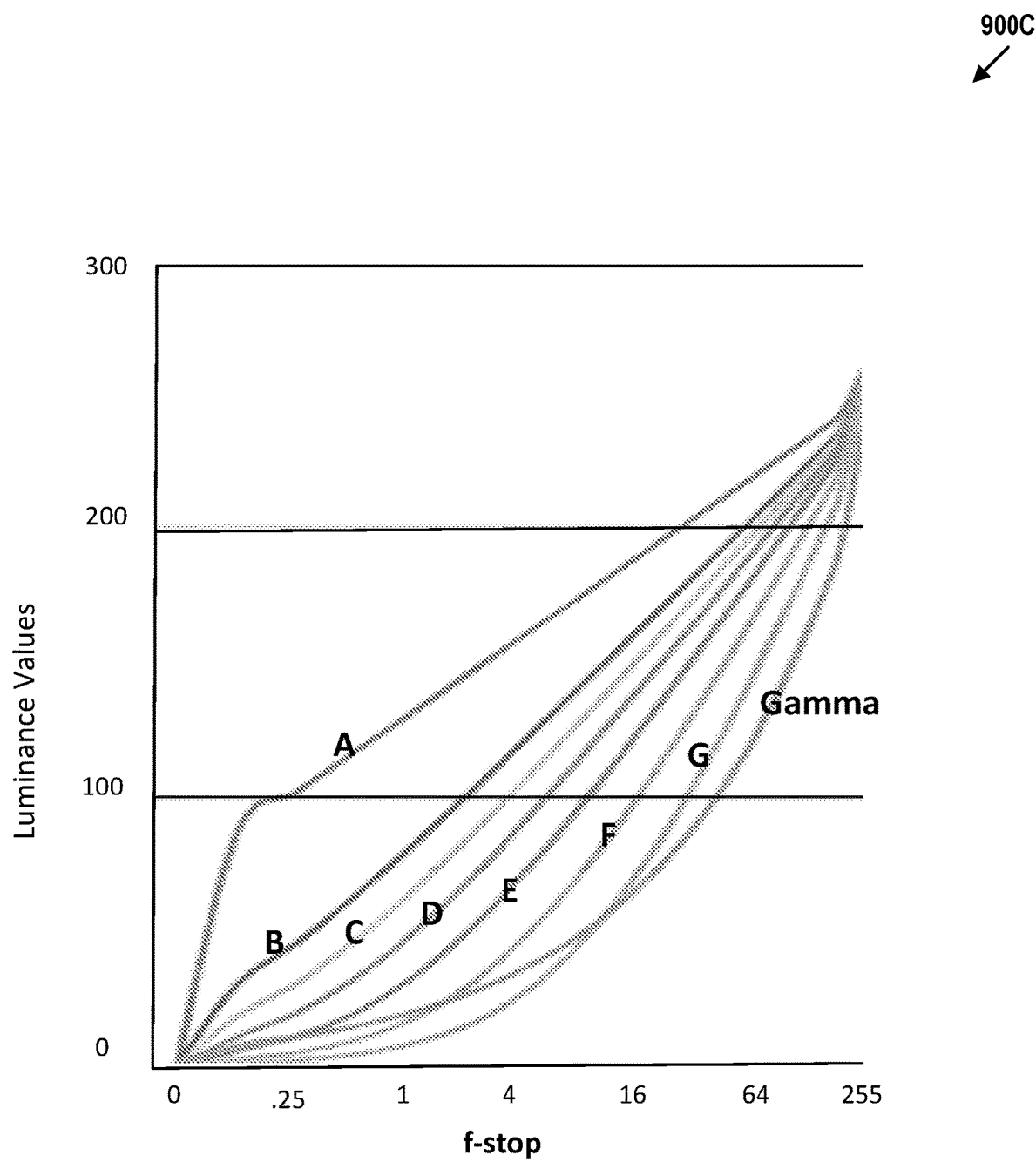
FIG. 9C illustrates an example graphical representation comparing various log-space compression curves with the gamma-space curve based on the table in FIG. 9B, in accordance with example embodiments.

FIG. 9C illustrates an example graphical representation 900C comparing various log-space compression curves with the gamma-space curve based on the table 900A in FIG. 9A, in accordance with example embodiments. The horizontal axis represents linear input values ranging from 0 to 255, and the vertical axis represents DNs for the f-stop. As the horizontal axis is spaced logarithmically, each f-stop corresponds to the same horizontal distance. The curves are labeled A through G, and Gamma, corresponding to respective columns in table 900A. Generally, a straight curve with slope 1 is more indicative of an even or uniform distribution of the bits. For example, curves C, D, and E appear to be candidates for an even distribution of the bits. In some embodiments, curve B may be selected based on a low variance (and appears to have the most straight appearance of all curves). Also, for example, any of curves A through G appear to provide an even distribution of the bits as compared to the gamma curve.

FIG. 10A illustrates an example table 1000A with log-space compression values based on a tuning parameter and a cutoff parameter, in accordance with example embodiments. In some embodiments, the logarithmic map may include a tuning parameter and a cutoff parameter.

As illustrated in table 1000A, the tuning parameter is labeled as "epsilon" 1002. The value of epsilon 1002 is fixed at 0.00001 for column A through G. Other values of epsilon may be used. Also, for example, the cutoff parameter is labeled as "cutoff" 1004 and various values of cutoff 1004 are represented, for example, 0.00002 corresponding to column A, 0.00004 corresponding to column B, 0.00008 corresponding to column C, 0.00016 corresponding to column D, 0.00032 corresponding to column E, 0.00064 corresponding to column F, and 0.00128 corresponding to column G.

Column C1 represents values of a linear input, with linear input values from 0 to 255. Column C2 represents a remapping of the values in column C1, normalized to be between 0 and 1. For example, in row 10AR2, the renormalized or remapped value in column C2 corresponding to the linear input value 0.125 in column C1 is 0.00049. As another example, in row 10AR3, the renormalized or remapped value in column C2 corresponding to the linear input value 0.25 in column C1 is 0.00098. Each of columns A through G represents globally tone mapped (log-compressed) values corresponding to the respective tuning parameter and the cutoff parameter. Although the tuning parameter is fixed and the cutoff parameter is varied, one or both of the tuning parameter and the cutoff parameter may be fixed and/or varied to achieve a desired outcome. In some embodiments, the globally tone mapped (log-compressed) values may be generated based on a logarithmic mapping such as:

$$\max\left[0, \frac{\log(\text{remapped} + \text{epsilon}) - \log(\text{cutoff})}{\log(1 + \text{epsilon}) - \log(\text{cutoff})}\right] * 255 \quad \text{(Eqn. 2)}$$

In some embodiments, the "remapped" value in Eqn. 2 may correspond to the values in column C2 of table 1000A, the "epsilon" value may be 0.00001, and the cutoff values may be from cutoff 1004. As the cutoff parameter changes, entries in each column are generated based on Eqn. 2. Although logarithm with base 10 has been used for illustrative purposes, any base may be utilized. Column C3 in table 1000A corresponds to a linear map, and column C4 in table 1000A corresponds to the gamma-compressed values for a gamma curve for 1/2.2. Also, Eqns. 1 and/or 2 are provided for illustrative purposes, and various modifications and/or combinations of Eqns. 1 and/or 2 (e.g., by varying one or more of epsilon or cutoff) may be used.

FIG. 10B illustrates an example table 1000B with digital number (DN) per f-stop values corresponding to the table 1000A in FIG. 10A, in accordance with example embodiments. For example, columns C1 and C2 represent a range for bit values. For example, row 10BR1 corresponds to bit values between linear input values ranging from 0 to 0.6225, row 10BR2 corresponds to bit values between linear input values ranging from 0.0625 and 0.125, and so forth. Columns A through G of table 1000B correspond to columns A through G of table 1000A, and each column represents DNs per f-stop, which may be approximately determined as a difference of the values in successive rows of a respective column in table 1000A.

For example, referring to table 1000B, the entry in column A and row 10BR2 is 16. Now referring to table 1000A, the entry in column A, row 10AR2 is 60, and the entry in column A, row 10AR3 is 76, and the difference 76−60=16 is the entry in column A and row 10BR2 of table 1000B.

As another example, referring to table 1000B, the entry in column D and row 10BR3 is 19.9. Now referring to table 1000A, the entry in column D, row 10AR3 is 53, and the entry in column D, row 10AR4 is 73, and the difference 53−73=20 is approximately the entry in column D and row 10BR3 of table 1000B. Entries for the DNs for the gamma compression may be determined in a similar manner with reference to successive rows of the gamma curve column of table 1000A.

In some embodiments, the cutoff parameter may be selected to allocate an equal number of bits to at least some control points of the one or more control points, and optionally to maintain an average value for the number of bits allocated to the one or more control points. For example, to select a desirable value for the cutoff parameter, one or more factors may be considered. For example, a variance for each column may be determined. The variance is indicative of a relative distribution of the DNs across f-stops. Accordingly, a column with a low variance indicates a uniform distribution of DNs. As another example, an average of values in each column may be determined. Also, for example, when under-exposure is not desired, then values in the bottom entries of a column may be considered. However, when stronger under-exposure is desired, then values in all the entries in the column may be considered.

Figure 10C:
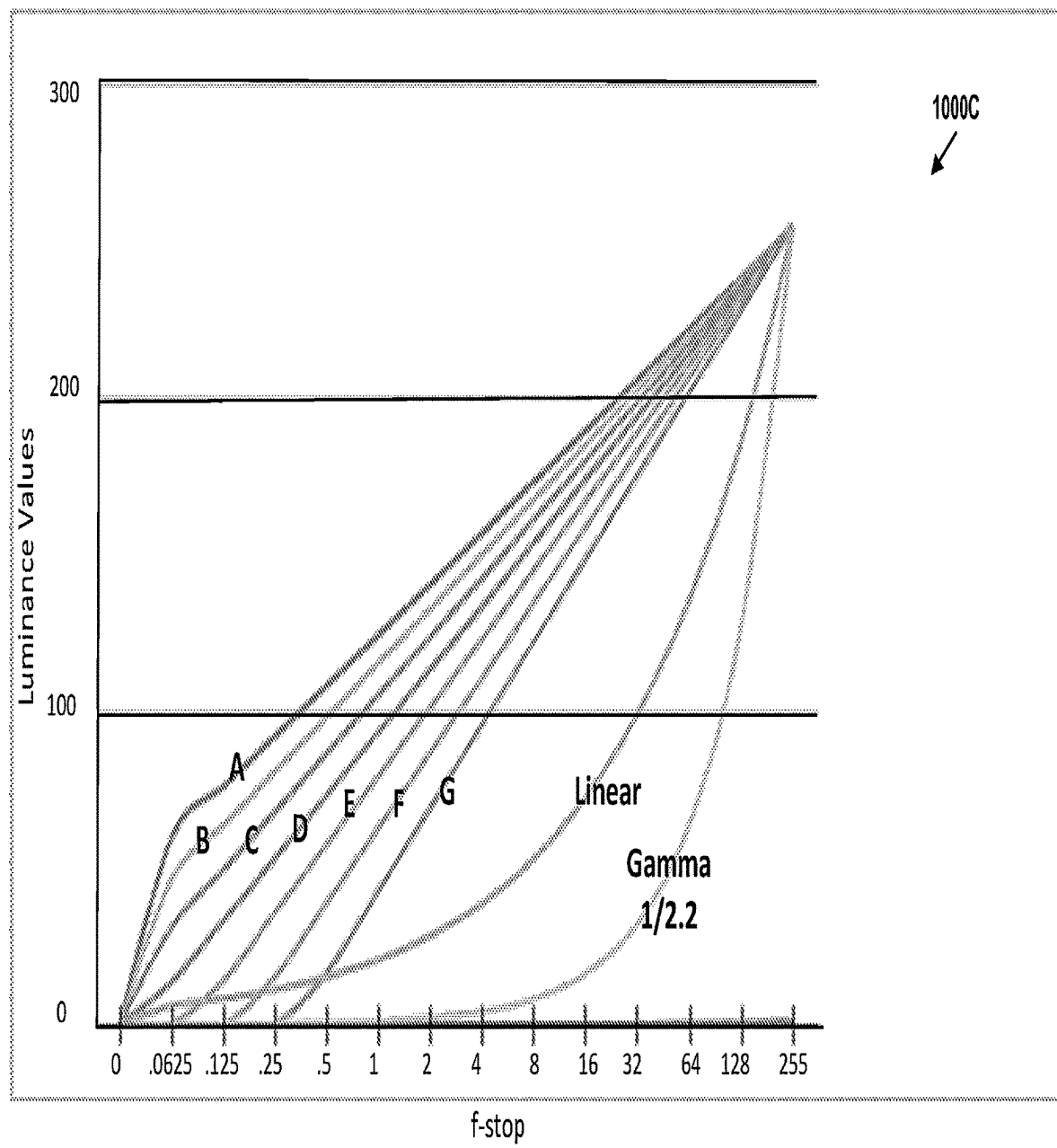
FIG. 10C illustrates an example graphical representation comparing various log-space compression curves with the gamma-space curve based on the table in FIG. 10B, in accordance with example embodiments.

FIG. 10C illustrates an example graphical representation 1000C comparing various log-space compression curves with the gamma-space curve based on the table 1000A in FIG. 10A, in accordance with example embodiments. The horizontal axis represents linear input values from 0 to 255, and the vertical axis represents a number of DNs. The curves are labeled A through G, Linear, and Gamma, corresponding to respective columns in table 1000A. Generally, a straight curve with slope 1 may be more indicative of an even distribution of the bits. For example, curve D appears to be a suitable candidate for an even distribution of the bits. In some embodiments, curve D may also be an optimal selection based on a low variance.

In some embodiments, a Look Up Table (LUT) may be used to store values, such as values in one or more columns of tables 900A, 900B, 1000A, and/or 1000C. Such LUTs may be hardcoded into the hardware during a manufacturing process. In some embodiments, a LUT may store a gamma curve, an S-curve, and/or one or more curves illustrated in graphical representation 900C, and/or 1000C. Also, for example, LUT with interpolation (e.g., linear, quadratic, cubic, and so forth) may be used for a higher bit-depth tone mapper (e.g. a 20 bits to 12 bits mapping, a 20 bits to 8 bits mapping, and so forth). For example, one or more DNs for representative luminance values and/or representative f-stops may be hardcoded into the hardware, and interpolation techniques may be utilized to generate the one or more curves (e.g. curves illustrated in graphical representation 900C, and/or 1000C).

Additional Example Operations

Figure 11:
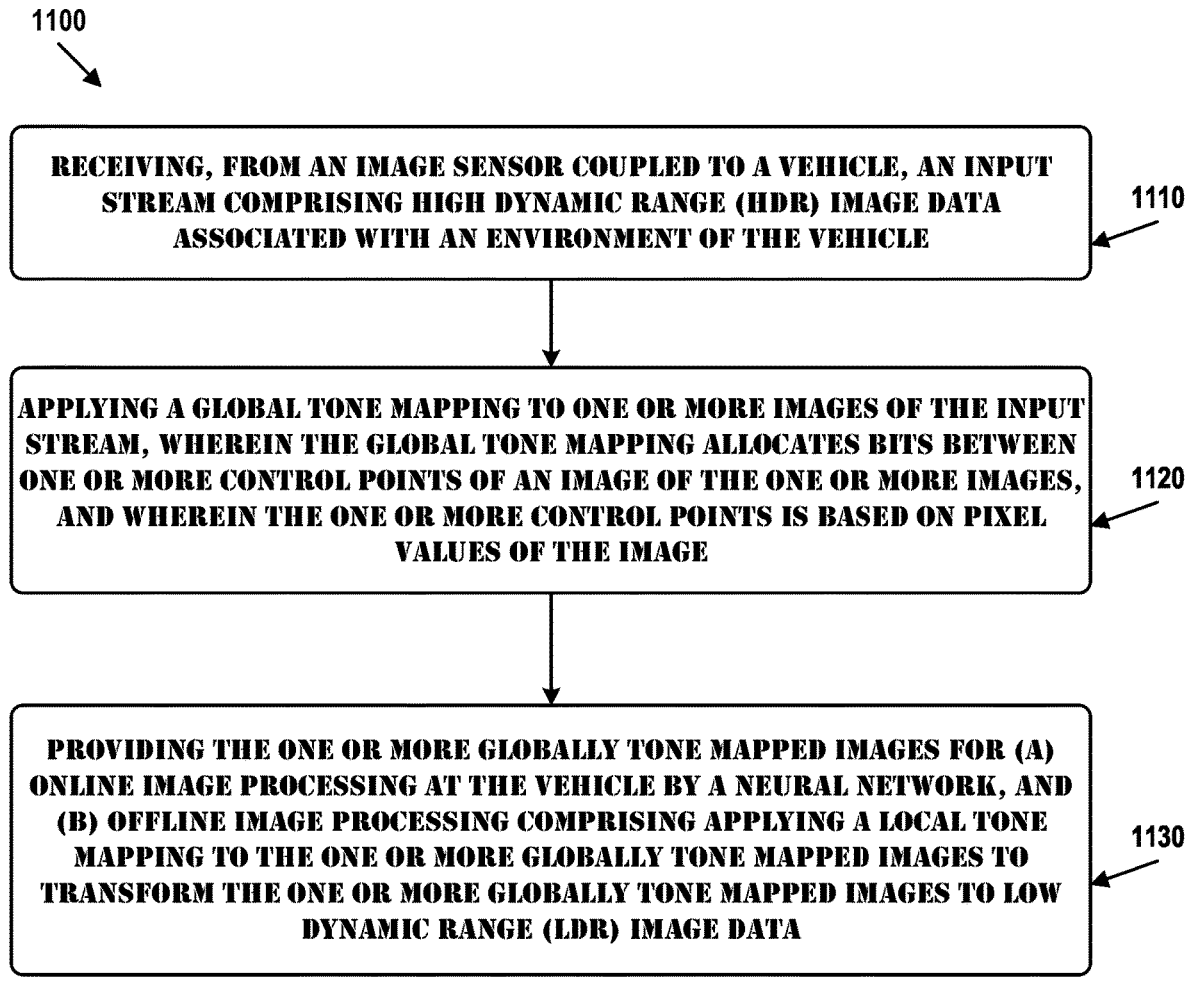
FIG. 11 illustrates a flow chart, in accordance with example embodiments.

FIG. 11 illustrates a flow chart, in accordance with example embodiments. The operations may be carried out by processor 113 of vehicle 100, the components thereof, and/or the circuitry associated therewith, among other possibilities. However, the operations can also be carried out by other types of devices or device subsystems. For example, the process could be carried out by a server device, an autonomous vehicle, and/or a robotic device.

The embodiments of FIG. 11 may be simplified by the removal of any one or more of the features shown therein. Further, these embodiments may be combined with features, aspects, and/or implementations of any of the previous figures or otherwise described herein.

Block 1110 may involve receiving, from an image sensor coupled to a vehicle, an input stream comprising high dynamic range (HDR) image data associated with an environment of the vehicle.

Block 1120 may involve applying a global tone mapping to one or more images of the input stream. The global tone mapping may allocate bits between one or more control points of an image of the one or more images. The one or more control points may be based on pixel values of the image.

Block 1130 may involve providing the one or more globally tone mapped images for (a) online image processing at the vehicle by a neural network, and (b) offline image processing comprising applying a local tone mapping to the one or more globally tone mapped images to transform the one or more globally tone mapped images to low dynamic range (LDR) image data.

In some embodiments, the applying of the global tone mapping may involve applying a logarithmic map to every pixel of the image. In some embodiments, the logarithmic map may include a tuning parameter, and wherein a higher value of the tuning parameter indicative of a less even distribution of the bits between the one or more control points. In some embodiments, the logarithmic map may include a cutoff parameter, and wherein the cutoff parameter may be selected based on an even distribution of the bits between the one or more control points. In some embodiments, the cutoff parameter may be selected to allocate an equal number of bits to at least some control points of the one or more control points, and to maintain an average value for the number of bits allocated to the one or more control points. In some embodiments, one or more of the tuning parameter or the cutoff parameter may be selected based on one or more of the image sensor, the neural network, or a display device configured to display the locally tone mapped image.

In some embodiments, the global tone mapping, the local tone mapping, or both may be performed based on a look-up table.

In some embodiments, the global tone mapping, the local tone mapping, or both may be performed based on an interpolation technique.

In some embodiments, the providing of the one or more globally tone mapped images to the neural network may involve compressing the one or more globally tone mapped images to a fewer number of bits.

In some embodiments, the one or more globally tone mapped images may be in a red, green, blue (RGB) format or a YUV format.

In some embodiments, the applying of the local tone mapping may involve applying a first map to a first portion of a globally tone mapped image, and applying a second map to a second portion of the globally tone mapped image.

In some embodiments, the offline image processing may involve generating a plurality of globally tone mapped images based on synthetic high dynamic range (HDR) bracketing. In some embodiments, the generating of the plurality of globally tone mapped images may involve generating a first image representing long exposure, a second image representing medium exposure, and a third image representing short exposure.

In some embodiments, the offline image processing may involve applying a gamma conversion to a locally tone mapped image.

In some embodiments, the offline image processing may involve displaying a standard dynamic range (SDR) image via a graphical user interface.

In some embodiments, the online image processing may involve determining one or more of: (i) geometric properties of at least one object of interest, (ii) a position of at least one object of interest within the environment, (iii) a speed of at least one object of interest, (iv) an optical flow associated with at least one object of interest, or (v) a classification of at least one object of interest.

In some embodiments, the control circuitry includes neural network circuitry, and the online image processing may involve analyzing the globally tone mapped image using the neural network circuitry. Such embodiments may also involve generating, by way of the neural network circuitry, neural network output data related to results of the processing of the globally tone mapped image.

Some embodiments may include a control system configured to control the vehicle based on data generated by the image sensor.

Example Computer Readable Media

Figure 12:
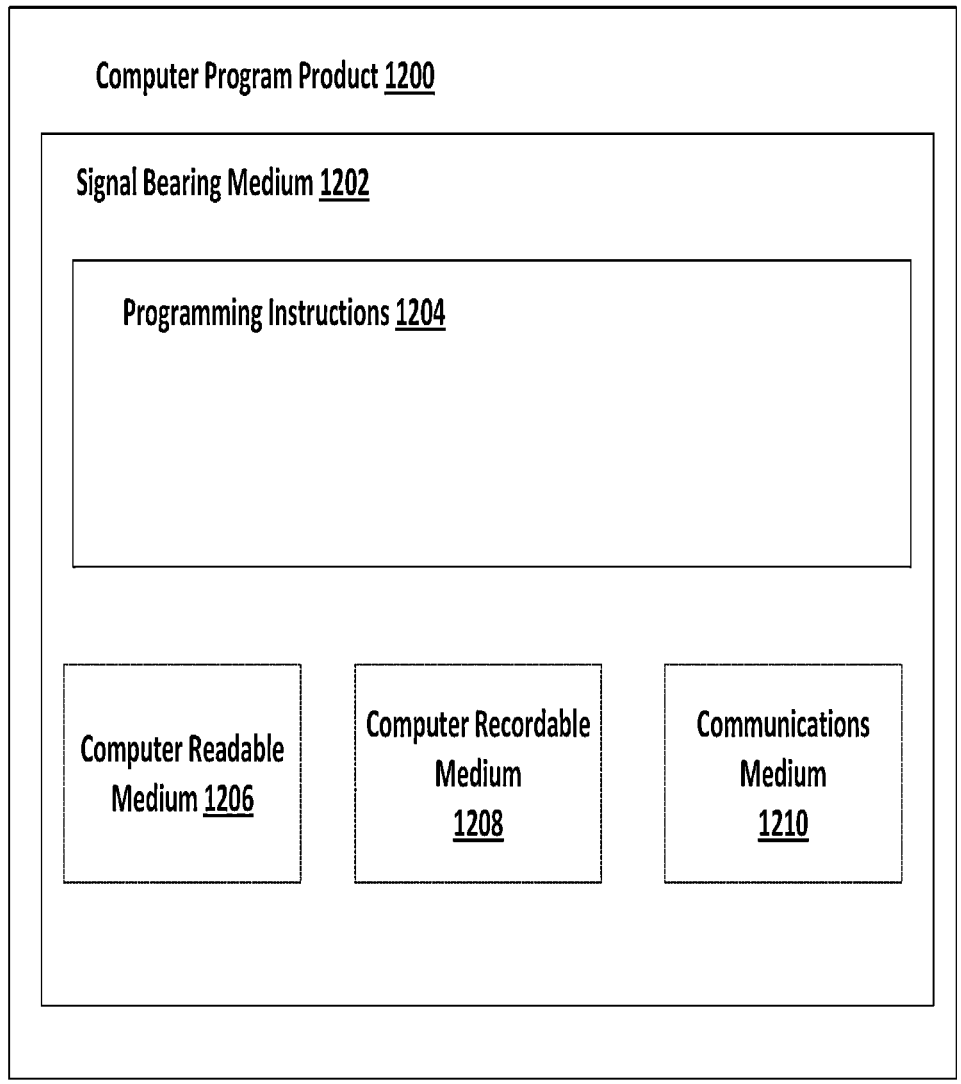
FIG. 12 depicts an example computer readable medium, in accordance with example embodiments.

FIG. 12 depicts an example computer readable medium, in accordance with example embodiments. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., described in flow chart 1100) may be implemented by computer program instructions encoded on a computer readable storage media in a machine-readable format, or on other media or articles of manufacture (e.g., instructions 115 of the vehicle 100). FIG. 12 is a schematic illustrating a conceptual partial view of an example computer program product that includes a computer program for executing a computer process on a computing device, such as on a radar planning system, arranged according to at least some embodiments disclosed herein.

In one embodiment, the example computer program product 1200 is provided using a signal bearing medium 1202. The signal bearing medium 1202 may include one or more programming instructions 1204 that, when executed by one or more processors may provide functionality or portions of the functionality described above with respect to FIGS. 1-11. In some examples, the signal bearing medium 1202 may be a computer-readable medium 1206, such as, but not limited to, a hard disk drive, a Compact Disc (CD), a Digital Video Disk (DVD), a digital tape, memory, etc. In some implementations, the signal bearing medium 1202 may be a computer recordable medium 1208, such as, but not limited to, memory, read/write (R/W) CDs, R/W DVDs, etc. In some implementations, the signal bearing medium 1202 may be a communication medium 1210 (e.g., a fiber optic cable, a waveguide, a wired communications link, etc.). Thus, for example, the signal bearing medium 1202 may be conveyed by a wireless form of the communications medium 1210.

The one or more programming instructions 1204 may be, for example, computer executable and/or logic implemented instructions. In some examples, a computing device may be configured to provide various operations, functions, or actions in response to the programming instructions 1204 conveyed to the computing device by one or more of the computer readable medium 1206, the computer recordable medium 1208, and/or the communications medium 1210.

The computer readable medium 1206 may also be distributed among multiple data storage elements, which could be remote from each other. The computing device that executes some or all of the stored instructions could be an external computer, or a mobile computing platform, such as a smartphone, tablet device, personal computer, wearable device, etc. Alternatively, the computing device that executes some or all of the stored instructions could be a remote computer system, such as a server, or a distributed cloud computing network.

CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for the purpose of illustration and are not intended to be limiting, with the true scope being indicated by the following claims.

What is claimed is:

1. A system comprising:
one or more sensors coupled to a vehicle, wherein the one or more sensors include an image sensor; and
control circuitry configured to perform operations comprising:
receiving, from the image sensor, an input stream comprising high dynamic range (HDR) image data associated with an environment of the vehicle;
applying a global tone mapping to one or more images of the input stream, wherein the applying of the global tone mapping comprises allocating bits between one or more control points of an image of the one or more images by applying a logarithmic map based on a tuning parameter, wherein a higher value of the tuning parameter is indicative of a less even distribution of the bits between the one or more control points;
providing the one or more globally tone mapped images for additional image processing.

2. The system of claim 1, wherein the applying of the global tone mapping comprises applying the logarithmic map to every pixel of the image.

3. The system of claim 1, wherein the logarithmic map comprises a cutoff parameter, and wherein the cutoff parameter is selected based on an even distribution of the bits between the one or more control points.

4. The system of claim 3, wherein the cutoff parameter is selected to allocate an equal number of bits to at least some control points of the one or more control points, and to maintain an average value for the number of bits allocated to the one or more control points.

5. The system of claim 1, wherein the global tone mapping is performed based on one or more of a look-up table or an interpolation technique.

6. The system of claim 1, wherein the one or more globally tone mapped images are in a red, green, blue (RGB) format or a YUV format.

7. The system of claim 1, wherein the global tone mapping is performed during online image processing at the vehicle.

8. The system of claim 1, wherein the providing of the one or more globally tone mapped images for additional image processing further comprises:
providing the one or more globally tone mapped images to a neural network.

9. The system of claim 8, wherein the providing of the one or more globally tone mapped images to the neural network further comprises:
compressing the one or more globally tone mapped images to a fewer number of bits.

10. The system of claim 8, wherein the additional image processing is performed by the neural network at the vehicle.

11. The system of claim 1, wherein the control circuitry comprises neural network circuitry, and wherein the additional image processing comprises:
analyzing the globally tone mapped image using the neural network circuitry; and
generating, by way of the neural network circuitry, neural network output data related to results of the processing of the globally tone mapped image.

12. The system of claim 1, wherein the additional image processing further comprises:
applying a local tone mapping to the one or more globally tone mapped images to transform the one or more globally tone mapped images to low dynamic range (LDR) image data.

13. The system of claim 12, wherein the applying of the local tone mapping is not performed at the vehicle.

14. The system of claim 12, wherein the applying of the local tone mapping is performed based on one or more of a look-up table or an interpolation technique.

15. The system of claim 12, wherein the applying of the local tone mapping further comprises:
applying a first map to a first portion of a globally tone mapped image of the one or more globally tone mapped images, and applying a second map to a second portion of the globally tone mapped image.

16. The system of claim 12, further comprising:
applying a gamma conversion to a locally tone mapped image.

17. The system of claim 1, further comprising a control system configured to control the vehicle based on data generated by the image sensor.

18. The system of claim 1, wherein the additional image processing comprises determining one or more of: (i) geometric properties of at least one object of interest, (ii) a position of at least one object of interest within the environment, (iii) a speed of at least one object of interest, (iv) an optical flow associated with at least one object of interest, or (v) a classification of at least one object of interest.

19. A non-transitory computer readable storage medium having stored thereon instructions that, when executed by a computing device, cause the computing device to perform operations comprising:
receiving, from an image sensor coupled to a vehicle, an input stream comprising high dynamic range (HDR) image data associated with an environment of the vehicle;
applying a global tone mapping to one or more images of the input stream, wherein the applying of the global tone mapping comprises allocating bits between one or more control points of an image of the one or more images by applying a logarithmic map based on a tuning parameter, wherein a higher value of the tuning parameter is indicative of a less even distribution of the bits between the one or more control points;

providing the one or more globally tone mapped images for additional image processing.

20. A method comprising:

receiving, from an image sensor coupled to a vehicle, an input stream comprising high dynamic range (HDR) image data associated with an environment of the vehicle;

applying a global tone mapping to one or more images of the input stream, wherein the applying of the global tone mapping comprises allocating bits between one or more control points of an image of the one or more images by applying a logarithmic map based on a tuning parameter, wherein a higher value of the tuning parameter is indicative of a less even distribution of the bits between the one or more control points;

providing the one or more globally tone mapped images for additional image processing.

* * * * *